United States Patent
Wagner et al.

(10) Patent No.: US 11,402,831 B2
(45) Date of Patent: Aug. 2, 2022

(54) SYSTEMS AND METHODS FOR PROCESSING OBJECTS, INCLUDING AUTOMATED MOBILE MATRIX BINS

(71) Applicant: Berkshire Grey Operating Company, Inc., Bedford, MA (US)

(72) Inventors: Thomas Wagner, Concord, MA (US); Kevin Ahearn, Nebo, NC (US); John Richard Amend, Jr., Belmont, MA (US); Benjamin Cohen, Somerville, MA (US); Michael Dawson-Haggerty, Pittsburgh, PA (US); William Hartman Fort, Stratham, NH (US); Christopher Geyer, Arlington, MA (US); Jennifer Eileen King, Oakmont, PA (US); Thomas Koletschka, Cambridge, MA (US); Michael Cap Koval, Mountain View, CA (US); Kyle Maroney, North Attleboro, MA (US); Matthew T. Mason, Pittsburgh, PA (US); William Chu-Hyon McMahan, Cambridge, MA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 105 days.

(21) Appl. No.: 16/739,670

(22) Filed: Jan. 10, 2020

(65) Prior Publication Data
US 2020/0147788 A1 May 14, 2020

Related U.S. Application Data

(63) Continuation of application No. 15/928,977, filed on Mar. 22, 2018, now Pat. No. 10,576,621.
(Continued)

(51) Int. Cl.
*G05B 19/418* (2006.01)
*B25J 9/00* (2006.01)
(Continued)

(52) U.S. Cl.
CPC .......... *G05B 19/41895* (2013.01); *B07C 3/00* (2013.01); *B07C 3/008* (2013.01);
(Continued)

(58) Field of Classification Search
CPC ... B07C 3/008; B25J 9/0093; G05B 19/41895
See application file for complete search history.

(56) References Cited

U.S. PATENT DOCUMENTS 1,030,320 A 6/1912 Morgan
2,294,945 A 9/1942 Zink
(Continued)

FOREIGN PATENT DOCUMENTS

AU 2006204622 A1 3/2007
CA 2795022 A1 10/2011
(Continued)

OTHER PUBLICATIONS

Notice on the Second Office Action and Second Office Action, along with its English translation, issued by the China National Intellectual Property Administration issued in related Chinese Patent Application No. 201880069627.9 dated Aug. 18, 2021, 16 pages.
(Continued)

*Primary Examiner* — Thomas Randazzo
(74) *Attorney, Agent, or Firm* — Gesmer Updegrove LLP

(57) ABSTRACT

A processing system for processing objects using a programmable motion device is disclosed. The processing system
(Continued)

includes a perception unit for perceiving identifying indicia representative of an identity of a plurality of objects received from an input conveyance system, an acquisition system for acquiring an object from the plurality of objects at an input area using an end effector of the programmable motion device, wherein the programmable motion device is adapted for assisting in the delivery of the object to an identified processing bin, and the identified processing bin is associated with the identifying indicia and said identified processing location is provided as one of a plurality of processing bins, and a delivery system for bringing the identified processing bin toward the object, where the delivery system includes a carrier for carrying the identified processing bin toward the object.

59 Claims, 26 Drawing Sheets

Related U.S. Application Data

(60) Provisional application No. 62/475,483, filed on Mar. 23, 2017.

(51) Int. Cl.
    *B25J 9/16*           (2006.01)
    *B65G 1/137*         (2006.01)
    *B65G 1/04*          (2006.01)
    *B07C 3/00*          (2006.01)
    *G06Q 10/08*        (2012.01)

(52) U.S. Cl.
    CPC ........... *B25J 9/0093* (2013.01); *B25J 9/1615* (2013.01); *B65G 1/0478* (2013.01); *B65G 1/0492* (2013.01); *B65G 1/1371* (2013.01); *B65G 1/1376* (2013.01); *B65G 1/1378* (2013.01); *G05B 19/41815* (2013.01); *G06Q 10/087* (2013.01)

(56) References Cited

U.S. PATENT DOCUMENTS

| | | |
|---|---|---|
| 3,223,259 A | 12/1965 | Nicholson |
| 4,114,762 A | 9/1978 | Beal et al. |
| 4,678,390 A | 7/1987 | Bonneton et al. |
| 4,722,653 A | 2/1988 | Williams et al. |
| 4,759,439 A | 7/1988 | Hartlepp |
| 4,846,335 A | 7/1989 | Hartlepp |
| 4,846,619 A | 7/1989 | Crabtree et al. |
| 4,895,242 A | 1/1990 | Michel |
| 5,190,162 A | 3/1993 | Hartlepp |
| 5,393,074 A | 2/1995 | Bear et al. |
| 5,525,884 A | 6/1996 | Sugiura et al. |
| 5,595,263 A | 1/1997 | Pignataro |
| 5,839,566 A | 11/1998 | Bonnet |
| 6,011,998 A | 1/2000 | Lichti et al. |
| 6,036,812 A | 3/2000 | Williams et al. |
| 6,059,092 A | 5/2000 | Jerue et al. |
| 6,079,570 A | 6/2000 | Oppliger et al. |
| 6,208,908 B1 | 3/2001 | Boyd et al. |
| 6,246,023 B1 | 6/2001 | Kugle |
| 6,323,452 B1 | 11/2001 | Bonnet |
| 6,377,867 B1 | 4/2002 | Bradley et al. |
| 6,390,756 B1 | 5/2002 | Isaacs et al. |
| 6,505,093 B1 | 1/2003 | Thatcher et al. |
| 6,543,983 B1 | 4/2003 | Felder et al. |
| 6,579,053 B1 | 6/2003 | Grams et al. |
| 6,685,031 B2 | 2/2004 | Takizawa |
| 6,688,459 B1 | 2/2004 | Bonham et al. |
| 6,762,382 B1 | 7/2004 | Danelski |
| 6,897,395 B2 | 5/2005 | Shiibashi et al. |
| 6,946,612 B2 | 9/2005 | Morikawa |
| 6,997,666 B1 | 2/2006 | Rodgers et al. |
| 7,728,244 B2 | 6/2010 | De Leo et al. |
| 7,861,844 B2 | 1/2011 | Hayduchok et al. |
| 8,718,814 B1 | 5/2014 | Clark et al. |
| 8,776,694 B2 | 7/2014 | Rosenwinkel et al. |
| 8,798,784 B1 | 8/2014 | Clark et al. |
| 8,831,984 B2 | 9/2014 | Hoffman et al. |
| 8,911,199 B2 | 12/2014 | Hermann et al. |
| 8,952,284 B1 | 2/2015 | Wong et al. |
| 8,972,045 B1 | 3/2015 | Mountz et al. |
| 8,989,918 B2 | 3/2015 | Sturm |
| 8,997,438 B1 | 4/2015 | Fallas |
| 9,020,632 B2 | 4/2015 | Naylor |
| 9,102,336 B2 | 8/2015 | Rosenwinkel |
| 9,111,251 B1 | 8/2015 | Brazeau |
| 9,120,622 B1 | 9/2015 | Elazary et al. |
| 9,216,857 B1 | 12/2015 | Kalyan et al. |
| 9,227,323 B1 | 1/2016 | Konolige et al. |
| 9,346,083 B2 | 5/2016 | Stone |
| 9,364,865 B2 | 6/2016 | Kim |
| 9,481,518 B2 | 11/2016 | Neiser |
| 9,492,923 B2 | 11/2016 | Wellman et al. |
| 9,517,899 B2 | 12/2016 | Watt et al. |
| 9,688,471 B2 | 6/2017 | Hellenbrand |
| 9,694,977 B2 | 7/2017 | Aprea et al. |
| 9,751,693 B1* | 9/2017 | Battles ............... B25J 9/0084 |
| 9,821,464 B2 | 11/2017 | Stiernagle et al. |
| 9,878,349 B2 | 1/2018 | Crest et al. |
| 9,926,138 B1 | 3/2018 | Brazeau et al. |
| 9,975,148 B2 | 5/2018 | Zhu et al. |
| 10,029,865 B1 | 7/2018 | McCalib, Jr. et al. |
| 10,576,621 B2 | 3/2020 | Wagner et al. |
| 10,611,021 B2 | 4/2020 | Wagner et al. |
| 10,625,934 B2 | 4/2020 | Mallady |
| 10,857,925 B1 | 12/2020 | Sahota |
| 2002/0092801 A1 | 7/2002 | Dominguez |
| 2002/0157919 A1 | 10/2002 | Sherwin |
| 2005/0002772 A1 | 1/2005 | Stone |
| 2005/0137933 A1* | 6/2005 | Holsen ............... G06Q 10/08 705/338 |
| 2005/0220600 A1 | 10/2005 | Baker et al. |
| 2006/0045672 A1 | 3/2006 | Maynard et al. |
| 2007/0209976 A1 | 9/2007 | Worth et al. |
| 2008/0181753 A1* | 7/2008 | Bastian ............... B65G 1/1376 414/277 |
| 2008/0269960 A1 | 10/2008 | Kostmann |
| 2009/0026017 A1 | 1/2009 | Freudelsperger |
| 2009/0074545 A1 | 3/2009 | Lert, Jr. et al. |
| 2010/0122942 A1 | 5/2010 | Harres et al. |
| 2011/0014021 A1 | 1/2011 | Reid et al. |
| 2011/0144798 A1 | 6/2011 | Freudelsperger |
| 2011/0238207 A1 | 9/2011 | Bastian, II et al. |
| 2011/0243707 A1 | 10/2011 | Dumas et al. |
| 2012/0128454 A1 | 5/2012 | Hayduchok et al. |
| 2012/0259482 A1 | 10/2012 | Jeschke |
| 2013/0110280 A1* | 5/2013 | Folk ............... B25J 15/0057 700/215 |
| 2013/0334158 A1* | 12/2013 | Koch ............... B61J 1/10 212/255 |
| 2014/0058556 A1 | 2/2014 | Kawano |
| 2014/0086709 A1 | 3/2014 | Kasai |
| 2014/0086714 A1 | 3/2014 | Malik |
| 2014/0100999 A1 | 4/2014 | Mountz et al. |
| 2014/0244026 A1* | 8/2014 | Neiser ............... B65G 1/1378 700/216 |
| 2014/0277693 A1 | 9/2014 | Naylor |
| 2015/0032252 A1 | 1/2015 | Galluzzo et al. |
| 2015/0073589 A1 | 3/2015 | Kodl et al. |
| 2015/0081090 A1* | 3/2015 | Dong ............... B07C 5/3422 700/230 |
| 2015/0098775 A1 | 4/2015 | Razumov |
| 2015/0114799 A1 | 4/2015 | Hansl et al. |
| 2015/0259077 A1 | 9/2015 | Wiskus |
| 2015/0375398 A1 | 12/2015 | Penn et al. |
| 2016/0075521 A1* | 3/2016 | Puchwein ............... B65G 47/06 700/218 |
| 2016/0129592 A1* | 5/2016 | Saboo ............... B25J 9/1661 700/248 |

(56) References Cited

U.S. PATENT DOCUMENTS

| | | | |
|---|---|---|---|
| 2016/0167227 A1 | 6/2016 | Wellman et al. | |
| 2016/0176638 A1* | 6/2016 | Toebes | G05D 1/0212 |
| | | | 701/25 |
| 2016/0236867 A1 | 8/2016 | Brazeau et al. | |
| 2016/0244262 A1* | 8/2016 | O'Brien | B25J 9/16 |
| 2016/0274586 A1 | 9/2016 | Stubbs et al. | |
| 2016/0325934 A1 | 11/2016 | Stiernagle et al. | |
| 2016/0347545 A1 | 12/2016 | Lindbo et al. | |
| 2016/0355337 A1 | 12/2016 | Lert et al. | |
| 2017/0021499 A1 | 1/2017 | Wellman et al. | |
| 2017/0043953 A1 | 2/2017 | Battles et al. | |
| 2017/0080566 A1 | 3/2017 | Stubbs et al. | |
| 2017/0106532 A1 | 4/2017 | Wellman et al. | |
| 2017/0107055 A1 | 4/2017 | Magens et al. | |
| 2017/0121114 A1* | 5/2017 | Einav | B65G 1/1373 |
| 2017/0157648 A1 | 6/2017 | Wagner et al. | |
| 2017/0225330 A1 | 8/2017 | Wagner et al. | |
| 2017/0305668 A1 | 10/2017 | Bestic et al. | |
| 2017/0305694 A1 | 10/2017 | McMurrough et al. | |
| 2017/0322561 A1 | 11/2017 | Stiernagle | |
| 2017/0349385 A1 | 12/2017 | Moroni et al. | |
| 2018/0085788 A1 | 3/2018 | Engel et al. | |
| 2018/0186572 A1 | 7/2018 | Issing | |
| 2018/0194571 A1 | 7/2018 | Fryer et al. | |
| 2018/0244473 A1 | 8/2018 | Mathi et al. | |
| 2018/0265298 A1 | 9/2018 | Wagner et al. | |
| 2018/0273297 A1 | 9/2018 | Wagner et al. | |
| 2018/0282066 A1 | 10/2018 | Wagner et al. | |
| 2018/0305122 A1 | 10/2018 | Moulin et al. | |
| 2018/0346022 A1 | 12/2018 | Payeur | |
| 2018/0354717 A1 | 12/2018 | Lindbo et al. | |
| 2019/0047786 A1 | 2/2019 | Suzuki | |
| 2019/0185267 A1* | 6/2019 | Mattern | B65B 5/105 |
| 2020/0143127 A1 | 5/2020 | Wagner et al. | |

FOREIGN PATENT DOCUMENTS

| | | |
|---|---|---|
| CA | 2985166 A1 | 12/2016 |
| CN | 1033604 A | 7/1989 |
| CN | 1927673 A | 3/2007 |
| CN | 102390701 A | 3/2012 |
| CN | 104105641 A | 10/2014 |
| CN | 204250465 U | 4/2015 |
| CN | 105383906 A | 3/2016 |
| CN | 105593143 A | 5/2016 |
| CN | 105668255 A | 6/2016 |
| CN | 105899398 A | 8/2016 |
| CN | 106395225 A | 2/2017 |
| CN | 106575391 A | 4/2017 |
| CN | 106662874 A | 5/2017 |
| CN | 206358714 U | 7/2017 |
| CN | 107054960 A | 8/2017 |
| CN | 107108122 A | 8/2017 |
| CN | 107161215 A | 9/2017 |
| DE | 957200 C | 1/1957 |
| DE | 3124537 C1 | 2/1983 |
| DE | 19510392 A1 | 9/1996 |
| DE | 19633238 A1 | 2/1998 |
| DE | 102008039764 | 5/2010 |
| DE | 102010002317 A1 | 8/2011 |
| DE | 10009087 A1 | 9/2013 |
| DE | 102012102333 A1 | 9/2013 |
| DE | 102014111396 A1 | 2/2016 |
| EP | 0235488 B1 | 1/1990 |
| EP | 1695927 A2 | 8/2006 |
| EP | 2062837 A1 | 5/2009 |
| EP | 2308777 A1 | 4/2011 |
| EP | 2477914 | 4/2013 |
| EP | 2650237 A1 * | 10/2013 ........... B65G 1/1378 |
| EP | 2650237 A1 | 10/2013 |
| EP | 2745982 A2 | 6/2014 |
| EP | 2937299 A1 | 10/2015 |
| EP | 3112295 A1 | 1/2017 |
| FR | 2036682 | 12/1970 |
| FR | 2174163 | 10/1973 |
| FR | 2832654 A1 | 5/2003 |
| GB | 2085389 A | 4/1982 |
| GB | 2539562 A | 12/2016 |
| JP | S54131278 A | 10/1979 |
| JP | S63310406 A | 12/1988 |
| JP | H0395001 A | 4/1991 |
| JP | H08157016 A | 6/1996 |
| JP | 2003067053 A | 3/2003 |
| JP | 2007182286 A | 7/2007 |
| JP | 2008037567 A | 2/2008 |
| JP | 2010202291 A | 9/2010 |
| JP | 2014141313 A | 8/2014 |
| JP | WO2017150006 A1 | 12/2018 |
| NO | 20150758 A1 | 12/2016 |
| WO | 3095339 A1 | 11/2003 |
| WO | 2005118436 A1 | 12/2005 |
| WO | 2007007354 A1 | 1/2007 |
| WO | 2007009136 A1 | 1/2007 |
| WO | 2008091733 A2 | 7/2008 |
| WO | 2010017872 A1 | 2/2010 |
| WO | 2011038442 A2 | 4/2011 |
| WO | 2011128384 A1 | 10/2011 |
| WO | 2012024714 A2 | 1/2012 |
| WO | 2012127102 A1 | 9/2012 |
| WO | 2014130937 | 8/2014 |
| WO | 2014166650 A1 | 10/2014 |
| WO | 2015035300 A1 | 3/2015 |
| WO | 2015118171 A1 | 8/2015 |
| WO | 2015140216 A1 | 9/2015 |
| WO | 2016198565 A1 | 12/2016 |
| WO | 2017036780 A1 | 3/2017 |
| WO | 2017064401 A1 | 4/2017 |
| WO | 2017081281 A1 | 5/2017 |
| WO | 2017148939 A1 | 9/2017 |
| WO | 2017148963 A1 | 9/2017 |

OTHER PUBLICATIONS

Examiner's Report issued by the Innovation, Science and Economic Development Canada (Canadian Intellectual Property Office) in related Canadian Patent Application No. 3,056,892 dated Oct. 1, 2021, 4 pages.

International Search Report and Written Opinion issued by the International Searching Authority, the European Patent Office, in related International Patent Application PCT/US2018/023836 dated Jun. 27, 2018, 12 pgs.

U.S. Office Action issued in related U.S. Appl. No. 15/928,977 dated Apr. 23, 2019, 19 pgs.

International Preliminary Report on Patentability issued by the International Bureau of WIPO dated Sep. 24, 2019 in related international application No. PCT/US2018/023836, 7 pages.

International Search Report and Written Opinion issued by the International Searching Authority, the European Patent Office, dated Jun. 29, 2018 in related international application No. PCT/US2018/024065, 11 pages.

International Preliminary Report on Patentability issued by the International Bureau of WIPO dated Sep. 24, 2019 in related international application No. PCT/US2018/024065, 8 pages.

U.S. Notice of Allowance issued in related U.S. Appl. No. 15/928,977 dated Oct. 28, 2019, 9 pages.

Communication pursuant to Rules 161(1) and 162EPC issued by the European Patent Office dated Oct. 30, 2019 in related European Patent Application No. 18717184.8, 3 pages.

Communication pursuant to Rules 161(1) and 162EPC issued by the European Patent Office dated Oct. 30, 2019 in related European Patent Application No. 18718031.0, 3 pages.

Non-Final Office Action issued by the U.S. Patent and Trademark Office dated May 21, 2019 in related U.S. Appl. No. 15/934,462, 26 pages.

Final Office Action issued by the United States Patent and Trademark Office in related U.S. Appl. No. 16/172,231 dated Jul. 29, 2021, 15 pages.

Notice on the Third Office Action and Third Office Action, along with its English translation, issued by the China National Intellec-

(56) References Cited

OTHER PUBLICATIONS tual Property Administration issued in related Chinese Patent Application No. 201880019478.5 dated Sep. 7, 2021, 10 pages.
First Office Action, and its English translation, issued by the China National Intellectual Property Administration issued in related Chinese Patent Application No. 201880019478.5 dated Aug. 25, 2020, 18 pages.
Examiner's Report issued by the Innovation, Science and Economic Development Canada in related Canadian Patent Application No. 3,056,892 dated Dec. 14, 2020, 3 pages.
U.S. Non-Final Office Action issued by the U.S. Patent and Trademark Office dated Jul. 27, 2020 in related U.S. Appl. No. 16/171,303, 13 pages.
International Preliminary Reporton Patentability issued by the International Bureau of WIPO in related International Application No. PCT/US2018/023339 dated Sep. 24, 2019, 7 pages.
International Search Report and Written Opinion of the International Search Authority, the European Patent Office, in related International Application No. PCT/US2018/023339 dated Jun. 18, 2018, 10 pages.
Communication pursuant to Rules 161(1) and 162 EPC issued by the European Patent Office dated Oct. 29, 2019 in related European Patent Application No. 18716070.0, 3 pages.
International Search Report and Written Opinion of the International Search Authority, the European Patent Office, in related International Application No. PCT/US2018/057600 dated Feb. 18, 2019, 10 pages.
International Search Report and Written Opinion of the International Search Authority, the European Patent Office, in related International Application No. PCT/US2018/057788 dated Feb. 18, 2018, 12 pages.
Partial International Search Report and Written Opinion of the International Search Authority, the European Patent Office, in related International Application No. PCT/US2018/057607 dated Feb. 11, 2018, 12 pages.
International Search Report and Written Opinion of the International Search Authority, the European Patent Office, in related International Application No. PCT/US2018/057607 dated Apr. 5, 2019, 16 pages.
International Search Report and Written Opinion of the International Search Authority, the European Patent Office, in related International Application No. PCT/US2018/057770 dated Feb. 18, 2019, 13 pages.
Partial International Search Report and Written Opinion of the International Search Authority, the European Patent Office, in related International Application No. PCT/US2018/057807 dated Feb. 18, 2019, 13 pages.
International Search Report and Written Opinion of the International Search Authority, the European Patent Office, in related International Application No. PCT/US2018/057807 dated Apr. 25, 2019, 16 pages.
Partial International Search Report and Written Opinion of the International Search Authority, the European Patent Office, in related International Application No. PCT/US2018/057795 dated Feb. 18, 2019, 14 pages.
International Search Report and Written Opinion of the International Search Authority, the European Patent Office, in related International Application No. PCT/US2018/057795 dated Apr. 12, 2019, 17 pages.
Non-Final Office Action issued by the U.S. Patent and Trademark Office in related U.S. Appl. No. 15/926,497 dated Jun. 10, 2019, 8 pages.
Non-Final Office Action issued by the U.S. Patent and Trademark Office in related U.S. Appl. No. 15/926,497 dated Dec. 11, 2019, 8 pages.
Non-Final Office Action issued by the U.S. Patent and Trademark Office in related U.S. Appl. No. 16/172,255 dated Apr. 1, 2020, 6 pages.
Non-Final Office Action issued by the U.S. Patent and Trademark Office in related U.S. Appl. No. 16/171,310 dated Jan. 9, 2020, 8 pages.
Non-Final Office Action issued by the U.S. Patent and Trademark Office in related U.S. Appl. No. 16/172,339 dated Mar. 30, 2020, 16 pages.
International Preliminary Reporton Patentability issued by the International Bureau of WIPO in related International Application No. PCT/US2018/057600 dated Apr. 28, 2020, 7 pages.
International Preliminary Reporton Patentability issued by the International Bureau of WIPO in related International Application No. PCT/US2018/057770 dated Apr. 28, 2020, 8 pages.
International Preliminary Reporton Patentability issued by the International Bureau of WIPO in related International Application No. PCT/US2018/057607 dated Apr. 28, 2020, 11 pages.
International Preliminary Reporton Patentability issued by the International Bureau of WIPO in related International Application No. PCT/US2018/057795 dated Apr. 28, 2020, 11 pages.
International Preliminary Reporton Patentability issued by the International Bureau of WIPO in related International Application No. PCT/US2018/057807 dated Apr. 28, 2020, 11 pages.
International Preliminary Reporton Patentability issued by the International Bureau of WIPO in related International Application No. PCT/US2018/057788 dated Apr. 28, 2020, 6 pages.
Communication pursuant to Rules 161(1) and 162 EPC issued by the European Patent Office in related European Patent Application No. 18807152.6 dated Jun. 4, 2020, 3 pages.
Communication pursuant to Rules 161(1) and 162 EPC issued by the European Patent Office in related European Patent Application No. 18804759.1 dated Jun. 4, 2020, 3 pages.
Communication pursuant to Rules 161(1) and 162 EPC issued by the European Patent Office in related European Patent Application No. 18807476.9 dated Jun. 4, 2020, 3 pages.
Communication pursuant to Rules 161(1) and 162 EPC issued by the European Patent Office in related European Patent Application No. 18807477.7 dated Jun. 4, 2020, 3 pages.
Communication pursuant to Rules 161(1) and 162 EPC issued by the European Patent Office in related European Patent Application No. 18807761.4 dated Jun. 5, 2020, 3 pages.
Communication pursuant to Rules 161(1) and 162 EPC issued by the European Patent Office in related European Patent Application No. 18804772.4 dated Jun. 4, 2020, 3 pages.
Notice on the First Office Action and First Office Action, along with its English translation, issued by the China National Intellectual Property Administration issued in related Chinese Patent Application No. 20880032530.0 dated Sep. 29, 2020, 23 pages.
Non-Final Office Action issued by the United States Patent and Trademark Office in related U.S. Appl. No. 16/172,353 dated Jan. 4, 2021, 12 pages.
Examiner's Report issued by the Innovation, Science and Economic Development Canada in related Canadian Patent Application No. 3,057,367 dated Dec. 1, 2020, 3 pages.
Final Office Action issued by the United States Patent and Trademark Office in related U.S. Appl. No. 16/171,310 dated Sep. 30, 2020, 8 pages.
Final Office Action issued by the United States Patent and Trademark Office in related U.S. Appl. No. 16/171,303 dated Feb. 11, 2021, 14 pages.
Notice on the First Office Action and First Office Action, along with its English translation, issued by the China National Intellectual Property Administration issued in related Chinese Patent Application No. 201880069642.3 dated Mar. 3, 2021, 19 pages.
Notice on the First Office Action and First Office Action, along with its English translation, issued by the China National Intellectual Property Administration issued in related Chinese Patent Application No. 201880032609.3 dated Nov. 20, 2020, 20 pages.
Notice on the First Office Action and First Office Action, along with its English translation, issued by the China National Intellectual Property Administration issued in related Chinese Patent Application No. 201880069729.0 dated Mar. 3, 2021, 16 pages.
Notice on the First Office Action and First Office Action, along with its English translation, issued by the China National Intellectual

(56) References Cited

OTHER PUBLICATIONS

Property Administration issued in related Chinese Patent Application No. 201880069684.7 dated Mar. 3, 2021, 14 pages.
Non-Final Office Action issued by the United States Patent and Trademark Office in related U.S. Appl. No. 16/172,231 dated Apr. 22, 2021, 11 pages.
Notice on the First Office Action and First Office Action, along with its English translation, issued by the China National Intellectual Property Administration issued in related Chinese Patent Application No. 201880069649.5 dated Mar. 23, 2021, 23 pages.
Notice on the Second Office Action and Second Office Action, along with its English translation, issued by the China National Intellectual Property Administration in related Chinese Patent Application No. 201880069642.3 dated Oct. 20, 2021, 13 pages.
Communication pursuant to Article 94(3) EPC issued by the European Patent Office in related European Patent Application No. 18717184.8 dated Nov. 11, 2021, 4 pages.
Communication pursuant to Article 94(3) EPC issued by the European Patent Office in related European Patent Application No. 18718031.0 dated Nov. 11, 2021, 4 pages.
Communication pursuant to Article 94(3) EPC issued by the European Patent Office in related European Patent Application No. 18716070.0 dated Nov. 11, 2021, 5 pages.
Notice on the Second Office Action and Second Office Action, along with its English translation, issued by the China National Intellectual Property Administration issued in related Chinese Patent Application No. 201880069649.5 dated Nov. 18, 2021, 7 pages.
Non-Final Office Action issued by the United States Patent and Trademark Office in related U.S. Appl. No. 16/789,917 dated Jan. 11, 2022, 34 pages.
Examiner's Report issued by the Innovation, Science and Economic Development Canada (Canadian Intellectual Property Office) in related Canadian Patent Application No. 3,076,511 dated Jan. 4, 2022, 4 pages.
Examiner's Report issued by the Innovation, Science and Economic Development Canada (Canadian Intellectual Property Office) in related Canadian Patent Application No. 3,078,778 dated Jan. 26, 2022, 4 pages.
Examiner's Report issued by the Innovation, Science and Economic Development Canada (Canadian Intellectual Property Office) in related Canadian Patent Application No. 3,076,511 dated May 5, 2021, 4 pages.
Notice on the Second Office Action and Second Office Action, along with its English translation, issued by the China National Intellectual Property Administration issued in related Chinese Patent Application No. 201880019478.5 dated Apr. 20, 2021, 9 pages.
Notice on the First Office Action and First Office Action, along with its English translation, issued by the China National Intellectual Property Administration issued in related Chinese Patent Application No. 201880069627.9 dated Jan. 19, 2021, 12 pages.
Examiner's Report issued by the Innovation, Science and Economic Development Canada in related Canadian Patent Application No. 3,057,313 dated Nov. 30, 2020, 3 pages.
Examiner's Report issued by the Innovation, Science and Economic Development Canada (Canadian Intellectual Property Office) in related Canadian Patent Application No. 3,076,514 dated May 28, 2021, 7 pages.
Examiner's Report issued by the Innovation, Science and Economic Development Canada (Canadian Intellectual Property Office) in related Canadian Patent Application No. 3,080,514 dated Jun. 2, 2021, 4 pages.
Notice on the Second Office Action and the Second Office Action, along with its English translation, issued by the China National Intellectual Property Administration in related Chinese Patent Application No. 201880032609.3 dated Jun. 25, 2021, 7 pages.
Examiner's Report issued by the Innovation, Science and Economic Development Canada (Canadian Intellectual Property Office) in related Canadian Patent Application No. 3,080,616 dated Jun. 28, 2021, 5 pages.
Examiner's Report issued by the Innovation, Science and Economic Development Canada (Canadian Intellectual Property Office) in related Canadian Patent Application No. 3,080,615 dated Jun. 21, 2021, 4 pages.

* cited by examiner

SYSTEMS AND METHODS FOR PROCESSING OBJECTS, INCLUDING AUTOMATED MOBILE MATRIX BINS

PRIORITY

The present application is a continuation of U.S. patent application Ser. No. 15/928,977, filed Mar. 22, 2018, now patented as U.S. Pat. No. 10,576,621, issued on Mar. 3, 2020, which claims priority to U.S. Provisional Patent Application Ser. No. 62/475,483, filed Mar. 23, 2017, the disclosures of which are hereby incorporated by reference in their entireties.

BACKGROUND

The invention generally relates to automated programmable motion control systems, e.g., robotic, sortation and other processing systems, and relates in particular to programmable motion control systems intended for use in environments requiring that a variety of objects (e.g., articles, packages, consumer products etc.) be processed and moved to a number of processing destinations.

Many object distribution systems, for example, receive objects in a disorganized stream or bulk transfer that may be provided as individual objects or objects aggregated in groups such as in bags, arriving on any of several different conveyances, commonly a conveyor, a truck, a pallet a Gaylord, or a bin etc. Each object must then be distributed to the correct destination location (e.g., a container) as determined by identification information associated with the object, which is commonly determined by a label printed on the object. The destination location may take many forms, such as a bag, a shelf, a container, or a bin.

The processing (e.g., sortation or distribution) of such objects has traditionally been done, at least in part, by human workers that scan the objects, for example with a hand-held barcode scanner, and then place the objects at assigned locations. Many order fulfillment operations, for example, achieve high efficiency by employing a process called wave picking. In wave picking, orders are picked from warehouse shelves and placed at locations (e.g., into bins) containing multiple orders that are sorted downstream. At the sorting stage, individual articles are identified, and multi-article orders are consolidated, for example, into a single bin or shelf location, so that they may be packed and then shipped to customers. The process of sorting these articles has traditionally been done by hand. A human sorter picks an article, and then places the article in the so-determined bin or shelf location where all articles for that order or manifest have been defined to belong. Automated systems for order fulfillment have also been proposed. See, for example, U.S. Patent Application Publication No. 2014/0244026, which discloses the use of a robotic arm together with an arcuate structure that is movable to within reach of the robotic arm.

The identification of objects by code scanning generally either require manual processing, or require that the code location be controlled or constrained so that a fixed or robot-held code scanner (e.g., a barcode scanner) can reliably detect the code. Manually operated barcode scanners are therefore generally either fixed or handheld systems. With fixed systems, such as those at point-of-sale systems, the operator holds the article and places it in front of the scanner, which scans continuously, and decodes any barcodes that it can detect. If the article's code is not immediately detected, the person holding the article typically needs to vary the position or orientation of the article with respect to the fixed scanner, so as to render the barcode more visible to the scanner. For handheld systems, the person operating the scanner may look at the barcode on the article, and then hold the article such that the barcode is within the viewing range of the scanner, and then press a button on the handheld scanner to initiate a scan of the barcode.

Further, many distribution center sorting systems generally assume an inflexible sequence of operation whereby a disorganized stream of input objects is provided (by a human) as a singulated stream of objects that are oriented with respect to a scanner that identifies the objects. An induction element or elements (e.g., a conveyor, a tilt tray, or manually movable bins) transport the objects to desired destination locations or further processing stations, which may be a bin, a chute, a bag or a conveyor etc.

In conventional object sortation or distribution systems, human workers or automated systems typically retrieve objects in an arrival order, and sort each object or objects into a collection bin based on a set of given heuristics. For example, all objects of a like type might be directed to a particular collection bin, or all objects in a single customer order, or all objects destined for the same shipping destination, etc. may be directed to a common destination location. Generally, the human workers, with the possible limited assistance of automated systems, are required to receive objects and to move each to their assigned collection bin. If the number of different types of input (received) objects is large, then a large number of collection bins is required.

FIG. 1 for example, shows an object distribution system 10 in which objects arrive, e.g., in trucks, as shown at 12, are separated and stored in packages that each include a specific combination of objects as shown at 14, and the packages are then shipped as shown at 16 to different retail stores, providing that each retail store receives a specific combination of objects in each package. Each package received at a retail store from transport 16, is broken apart at the store and such packages are generally referred to as break-packs. In particular, incoming trucks 12 contain vendor cases 18 of homogenous sets of objects. Each vendor case, for example, may be provided by a manufacturer of each of the objects. The objects from the vendor cases 18 are moved into decanted bins 20, and are then brought to a processing area 14 that includes break-pack store packages 22. At the processing area 14, the break-pack store packages 22 are filled by human workers that select items from the decanted vendor bins to fill the break-pack store packages according to a manifest. For example, a first set of the break-pack store packages may go to a first store (as shown at 24), and a second set of break-pack store packages may go to a second store (as shown at 26). In this way, the system may accept large volumes of product from a manufacturer, and then re-package the objects into break-packs to be provided to retail stores at which a wide variety of objects are to be provided in a specific controlled distribution fashion.

Such a system, however, has inherent inefficiencies as well as inflexibilities since the desired goal is to match incoming objects to assigned collection bins. Such systems may require a large number of collection bins (and therefore a large amount of physical space, large investment costs, and large operating costs), in part, because sorting all objects to all destinations at once is not always most efficient. Additionally, such break-pack systems must also monitor the volume of each like object in a bin, requiring that a human worker continuously count the items in a bin.

Further, current state-of-the-art sortation systems also rely on human labor to some extent. Most solutions rely on a worker that is performing sortation, by scanning each object from an induction area (chute, table, etc.) and placing each object at a staging location, conveyor, or collection bin. When a bin is full, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Unfortunately, these systems do not address the limitations of the total number of system bins. The system is simply diverting an equal share of the total objects to each parallel manual cell. Thus, each parallel sortation cell must have all the same collection bin designations; otherwise, an object may be delivered to a cell that does not have a bin to which the object is mapped. There remains a need, therefore, for a more efficient and more cost effective object processing system that processes objects of a variety of sizes and weights into appropriate collection bins or trays of fixed sizes, yet is efficient in handling objects of varying sizes and weights.

SUMMARY

In accordance with an embodiment, the invention provides a processing system for processing objects using a programmable motion device. The processing system includes a perception unit for perceiving identifying indicia representative of an identity of a plurality of objects received from an input conveyance system, an acquisition system for acquiring an object from the plurality of objects at an input area using an end effector of the programmable motion device, wherein the programmable motion device is adapted for assisting in the delivery of the object to an identified processing bin, and the identified processing bin is associated with the identifying indicia and said identified processing location is provided as one of a plurality of processing bins, and a delivery system for bringing the identified processing bin toward the object, where the delivery system includes a carrier for carrying the identified processing bin toward the object.

In accordance with another embodiment, the invention provides a processing system for processing objects using a programmable motion device, where the processing system includes a perception unit for perceiving identifying indicia representative of an identity of a plurality of objects associated with an input conveyance system, an acquisition system for acquiring an object from the plurality of objects at an input area using an end effector of the programmable motion device, wherein the programmable motion device is adapted for assisting in the delivery of the object to an identified processing bin, and the identified processing bin is associated with the identifying indicia and said identified processing container is provided as one of a plurality of processing bins, and a delivery system for bringing the identified processing container toward the programmable motion device by moving the identified processing bin in at least two dimensions.

In accordance with a further embodiment, the invention provides a method of processing objects using a programmable motion device. The method includes the steps of perceiving identifying indicia representative of an identity of a plurality of objects received from an input conveyance system, acquiring an object from the plurality of objects at an input area using an end effector of the programmable motion device, wherein the programmable motion device is adapted for assisting in the delivery of the object to an identified processing bin, said identified processing bin being associated with the identifying indicia and the identified processing location being provided as one of a plurality of processing bins, and bringing the identified processing bin toward the object, including providing a carrier for carrying the identified processing bin toward the object.

BRIEF DESCRIPTION OF THE DRAWINGS

The following description may be further understood with reference to the accompanying drawings in which.

Figure 1:
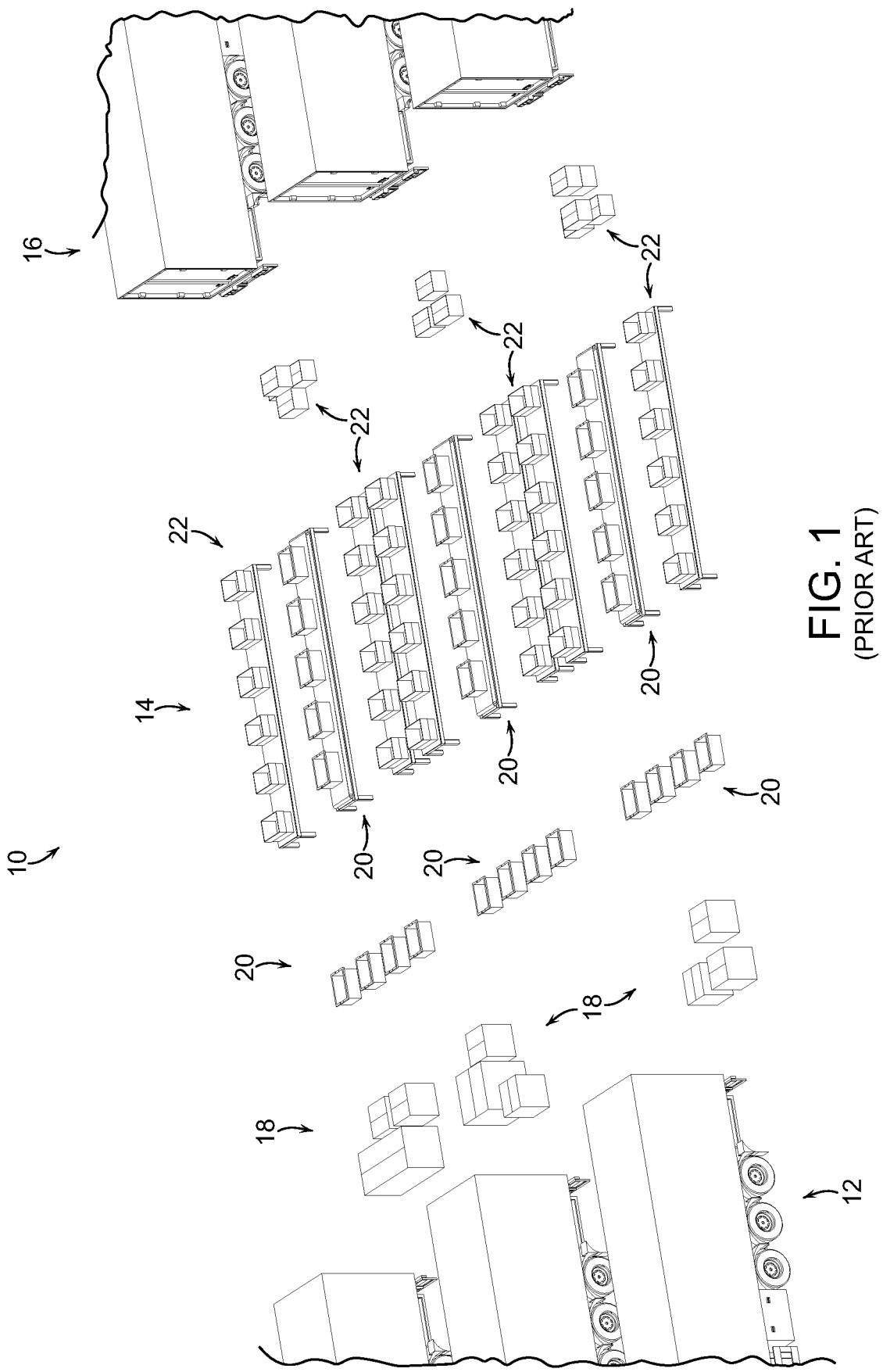
FIG. 1 shows an illustrative diagrammatic view of an object processing system of the prior art.

The drawings are shown for illustrative purposes only.

DETAILED DESCRIPTION

In accordance with an embodiment, the invention provides a processing system for processing objects using a programmable motion device. The processing system includes a perception unit, an acquisition system and a delivery system. The perception unit is for perceiving identifying indicia representative of an identity of a plurality of objects received from an input conveyance system. The acquisition system is for acquiring an object from the plurality of objects at an input area using an end effector of the programmable motion device, wherein the programmable motion device is adapted for assisting in the delivery of the object to an identified processing bin. The identified processing bin is associated with the identifying indicia and the identified processing location is provided as one of a plurality of processing bins. The delivery system is for bringing the identified processing bin toward the object, and the delivery system includes a carrier for carrying the identified processing bin toward the object. The processing bins may, for example, be totes, boxes or any of a variety of items for containing objects.

Generally, objects need to be identified and conveyed to desired object specific locations. The systems reliably automate the identification and conveyance of such objects, employing in certain embodiments, a set of conveyors, a perception system, and a plurality of destination bins. In short, applicants have discovered that when automating sortation of objects, there are a few main things to consider: 1) the overall system throughput (objects sorted per hour), 2) the number of diverts (i.e., number of discrete locations to which an object can be routed), 3) the total area of the sortation system (square feet), and 4) the capital and annual costs to purchase and run the system.

Processing objects in a break-pack distribution center is one application for automatically identifying and processing objects. As noted above, in a break-pack distribution center, objects commonly arrive in trucks, are conveyed to sortation stations where they are sorted according to desired destinations into bins (e.g., boxes or packages) that are then loaded in trucks for transport to, for example, shipping or distribution centers or retail stores. In a shipping or distribution center, the desired destination is commonly obtained by reading identifying information printed on the box or package. In this scenario, the destination corresponding to identifying information is commonly obtained by querying the customer's information system. In other scenarios, the destination may be written directly on the box, or may be known through other means such as by assignment to a vendor bin.

The system also requests specific bins of objects from a storage system, which helps optimize the process of having desired objects be delivered to specific singulator cells in an efficient way without simply letting all bins of objects appear at each singulator cell in a purely random order.

Figure 2:
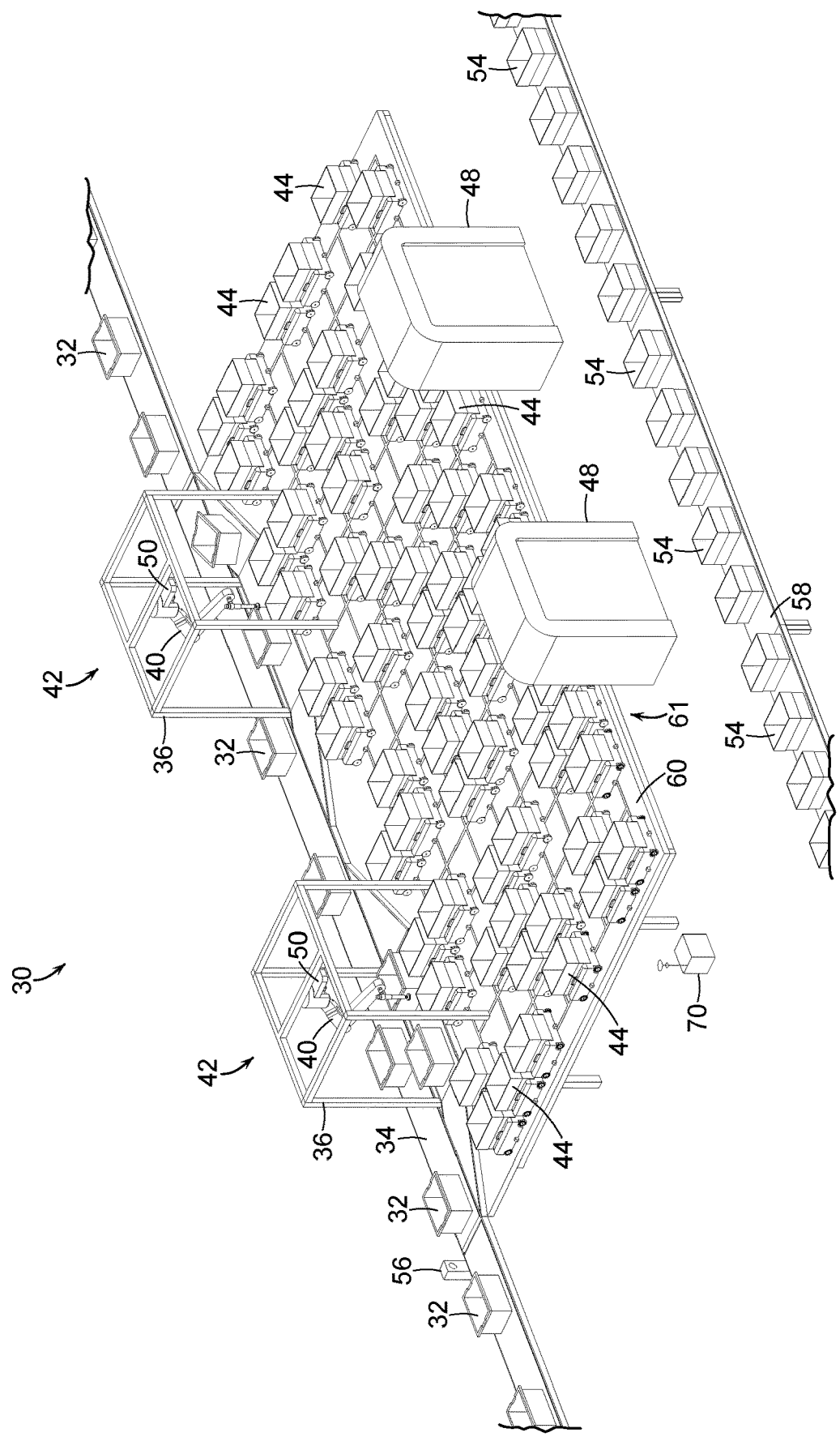
FIG. 2 shows an illustrative diagrammatic view of an object processing system in accordance with an embodiment of the present invention.

FIG. 2, for example, shows a system 30 in accordance with an embodiment of the present invention that receives decanted vendor bins 32 on an in-feed conveyor 34 that pass by a plurality of processing stations 42. One (or more) programmable motion device 40 such as an articulated arm having an end effector is provided suspended from a support fame 36. Adjacent a base of the articulated arm and also suspended from the support frame 36 is a perception unit 50 (as further discussed below with reference to FIG. 9). Additional perception units 56 may be provided (for example, near vendor bin in-feed conveyor 34) that capture perception information regarding a label that is applied to each bin 32 that associates the bin with the contents of the bin.

Figure 3:
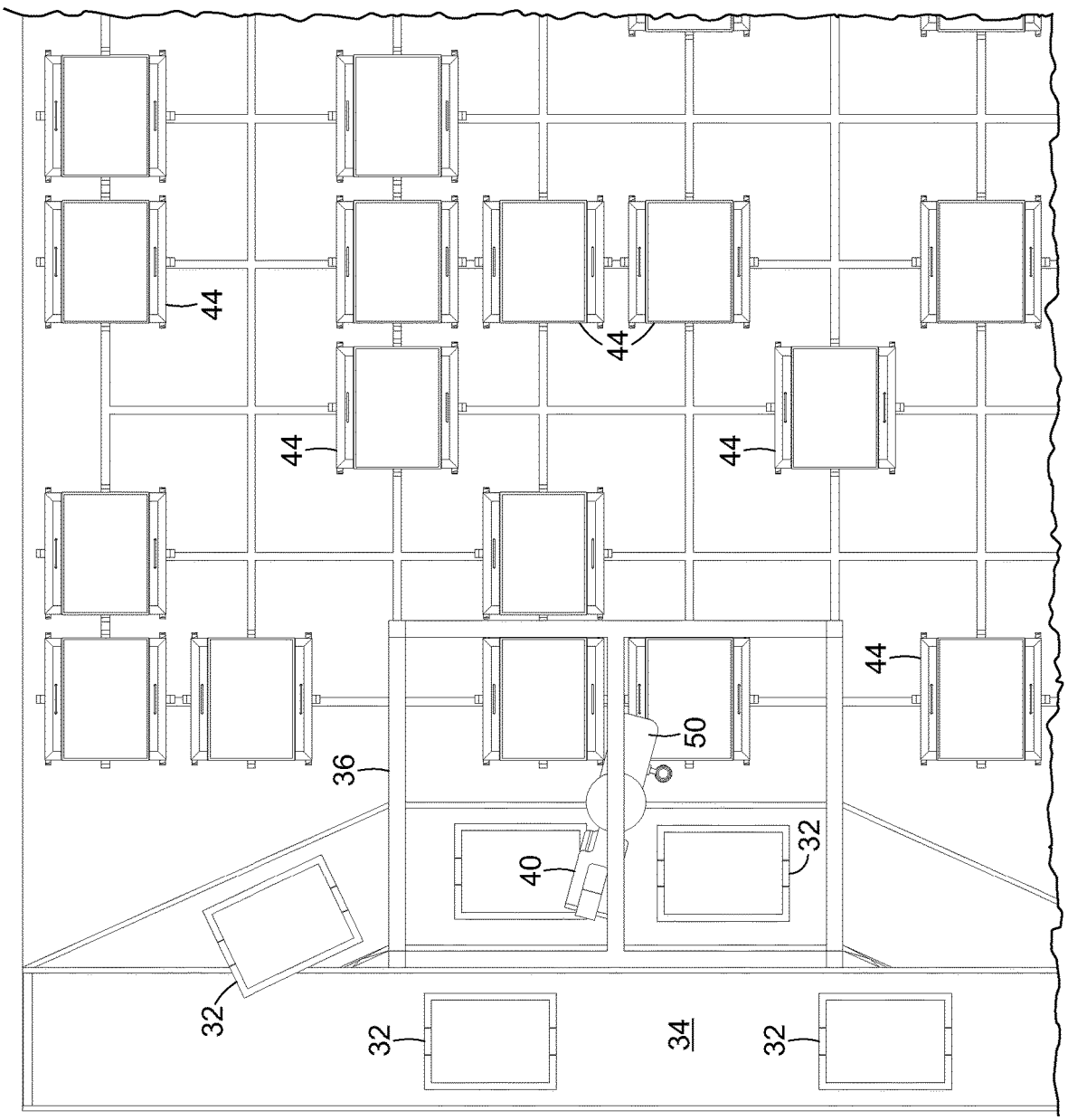
FIG. 3 shows an illustrative diagrammatic view of an object processing system in accordance with another embodiment of the present invention.

The programmable motion device is programmed to access each of the vendor bins 32 and to move any of the objects in bins 32 at input areas 38 to one of a plurality of bins (break-pack packages) 44 at one or more processing locations near the device 40 (as further shown in FIG. 3). Each bin 44 is provided on an automated mobile device 46, and once an object has been placed in a bin 44, the automated mobile device 46 returns to a track matrix until the associated package is again requested to be delivered to a processing station 42. Each package may be called to any number of processing stations 42 until the package is completed. When a bin 44 is full or otherwise complete, human personnel may be employed to move the packages to an output conveyor 52. In accordance with further embodiments, when a bin 44 is full (complete), the system will cause the associated mobile device 46 to move the completed bin to an output station 248 (as further shown in FIGS. 28-31) where the bin is loaded onto an output conveyor 52, and the associated mobile device 46 engages a new empty bin 54 from a bin supply conveyor 58. The new empty bin is then assigned a new set of packaging contents from a central manifest.

With further reference to FIG. 3, at each processing station 42 one or more vendor bins 32 are routed to an input area 38, and a programmable motion device 40 is actuated to grasp an object from a bin 32, and to place the object into a package 44. The processed vendor bins are then returned to a common input stream, and the bin 44 that received the object is moved (via the automated mobile carrier 46) to move the bin away from the processing station 42.

Figure 4:
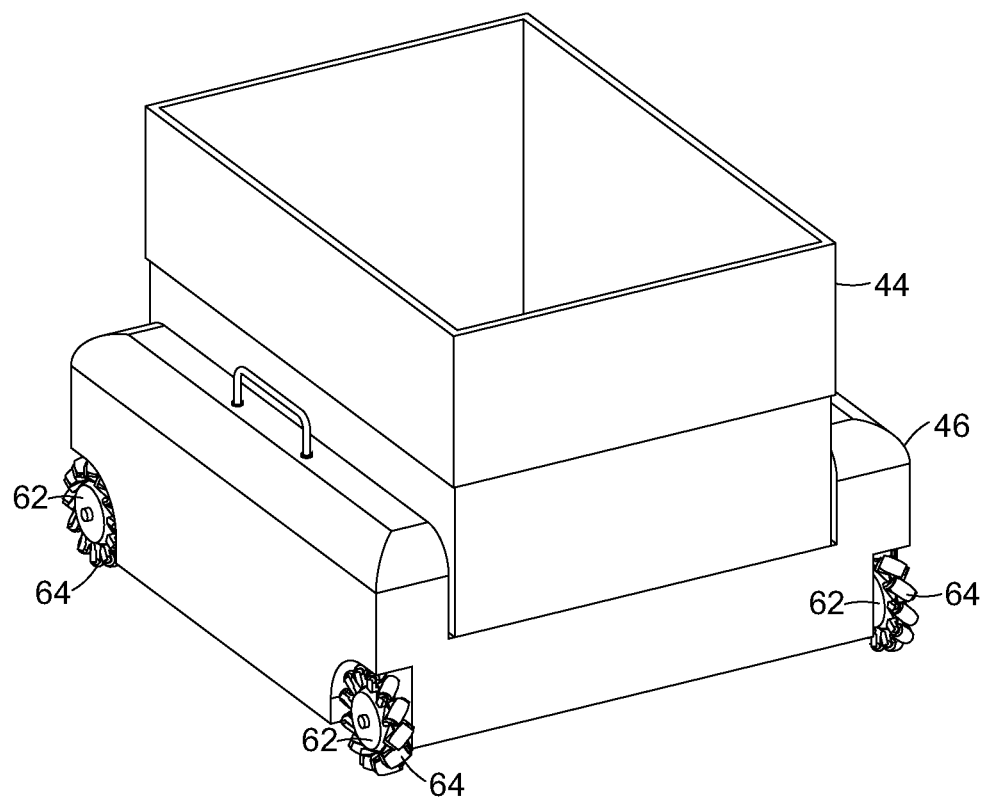
FIG. 4 shows an illustrative diagrammatic view of a carrier for use in a system in accordance with another embodiment of the present invention.
Figure 5:
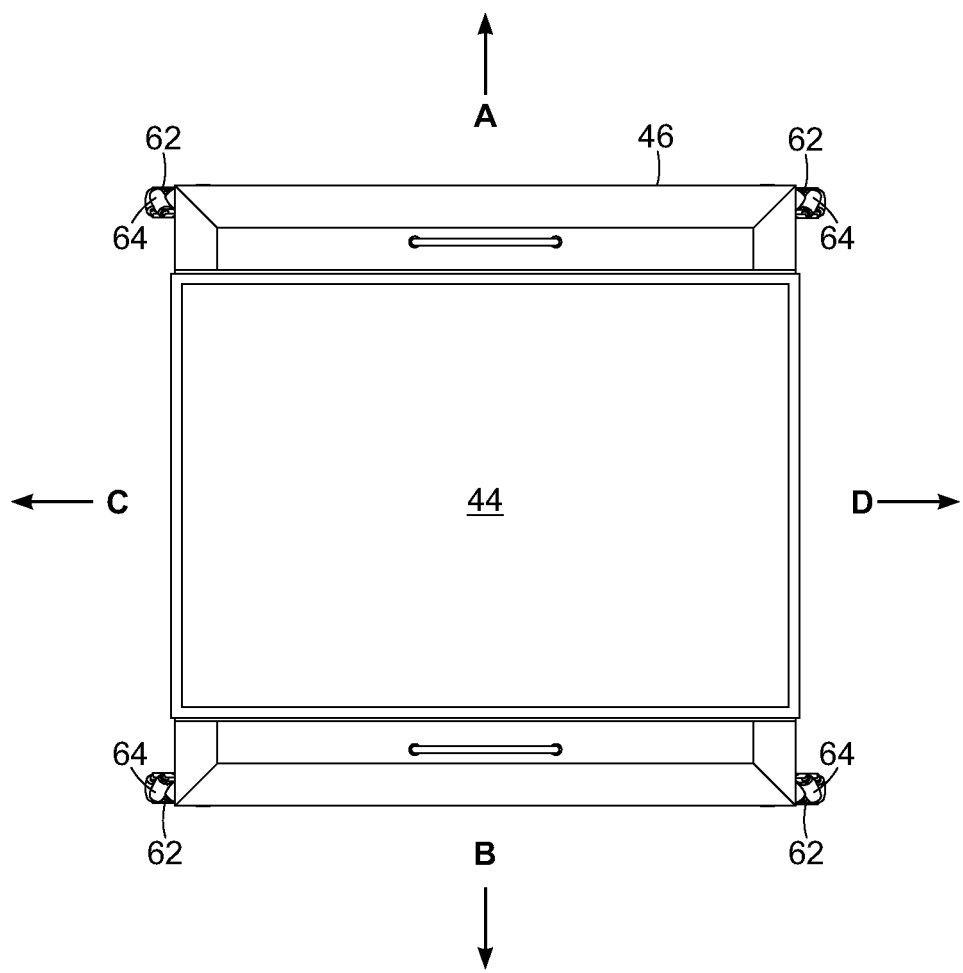
FIG. 5 shows an illustrative diagrammatic top view of the carrier shown in FIG. 4.

Each automated mobile carrier 46 is able to move about the X-Y track 60 with freedom of movement (but for requiring that the control system accommodate moving other mobile devices to make appropriate paths). As shown in FIG. 4 each automated mobile carrier 46 may include a portion for receiving a bin 44, as well as a set of wheels that permit the carrier 46 to move about the track 60. The carrier 46 may turn by operating opposing wheels in mutually reverse directions. As further shown in FIG. 4, in other embodiments, each wheel may instead be a controllable omnidirectional wheel 60, such as the Mecanum wheels sold by Mecanum AB of Sweden. Each wheel 60 is generally a conventional wheel with a series of controllable rollers 64 attached to the circumference of each wheel. While the wheels 62 provide movement in mutually opposing direction as a conventional wheel, actuation of the rollers 64 provide movement in orthogonal mutually opposing directions, facilitating movement of the carriers 46 about the track 60 as shown in the top view of FIG. 5.

Figure 6:
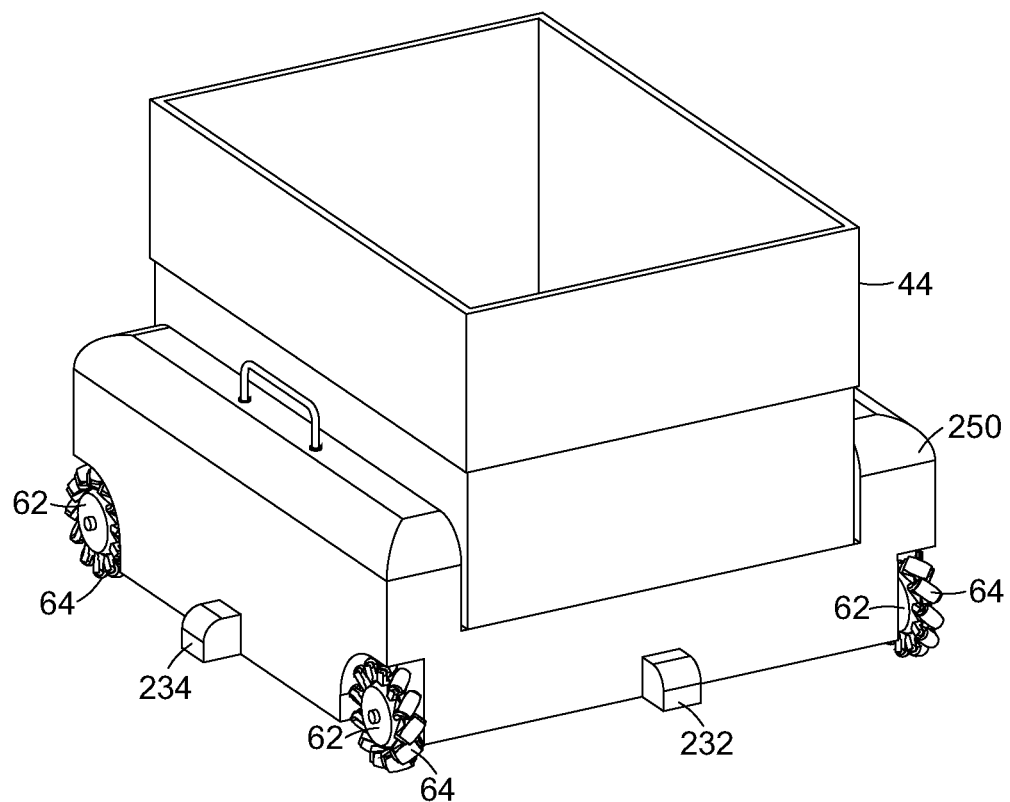
FIG. 6 shows an illustrative diagrammatic view of a carrier for use in a system in accordance with a further embodiment of the present invention.
Figure 7:
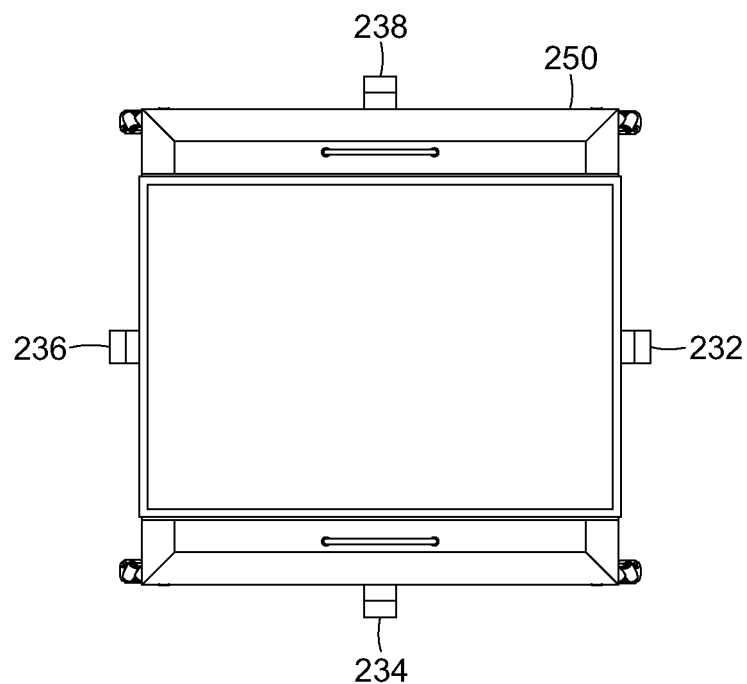
FIG. 7 shows an illustrative diagrammatic top view of the carrier shown in FIG. 6.
Figure 8:
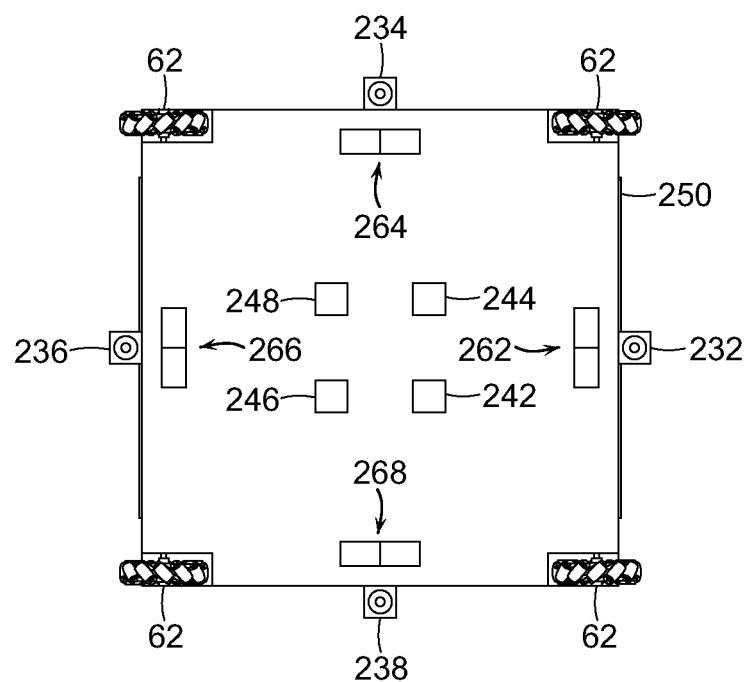
FIG. 8 shows an illustrative diagrammatic bottom view of the carrier shown in FIG. 6.

In accordance with a further embodiment, FIG. 6 shows a carrier 250 that includes four illumination sources 232, 234, 236, 238 for illuminating the track below each source. FIG. 7 shows a top view of the carrier 250, showing the position of each of the illumination sources 232, 234, 236, 238. FIG. 8 shows an underside of the carrier 250, which shows four pairs of illumination sensors 262, 264, 266, 268. As the carrier 250 moves over a track (e.g., a section of track that is under sensor pairs 262, 266), the system monitors the amount of light being received at each pair of underside sensors (e.g., each of pair 262 and each of pair 266) to determine if the amount of illumination being received by each of the pair is generally the same. If much more illumination is received by one of a pair, the system may assume that the carrier has run off course. Having two such pairs (e.g., 262, 266) for a painted track line, provides further robustness to the system. Additionally, sensors (or indicia) 242, 244, 246, 248 may be provided on the underside of each carrier 150 for communicating with any of indicia (or sensors) on the track. This may assist in providing further security in confirming the location of a carrier, and/or in providing turning instructions to a carrier.

It is assumed that the bins of objects are marked in one or more places on their exterior with a visually distinctive mark such as a barcode (e.g., providing a UPC code) or radio-frequency identification (RFID) tag or mailing label so that they may be sufficiently identified with a scanner for processing. The type of marking depends on the type of scanning system used, but may include 1D or 2D code symbologies. Multiple symbologies or labeling approaches may be employed. The types of scanners employed are assumed to be compatible with the marking approach. The marking, e.g. by barcode, RFID tag, mailing label or other means, encodes a identifying indicia (e.g., a symbol string), which is typically a string of letters and/or numbers. The symbol string uniquely associates the vendor bin with a specific set of homogenous objects.

The operations of the system described above are coordinated with a central control system 70 as shown in FIG. 2 that communicates wirelessly with the articulated arm 40, the perception units 50 and 56, as well as in-feed conveyor 34 and the automated mobile carriers. This system determines from symbol strings the UPC associated with a vendor bin, as well as the outbound destination for each object. The central control system 70 is comprised of one or more workstations or central processing units (CPUs). For example, the correspondence between UPCs or mailing labels, and outbound destinations is maintained by a central control system in a database called a manifest. The central control system maintains the manifest by communicating with a warehouse management system (WMS). The manifest provides the outbound destination for each in-bound object.

Figure 9:
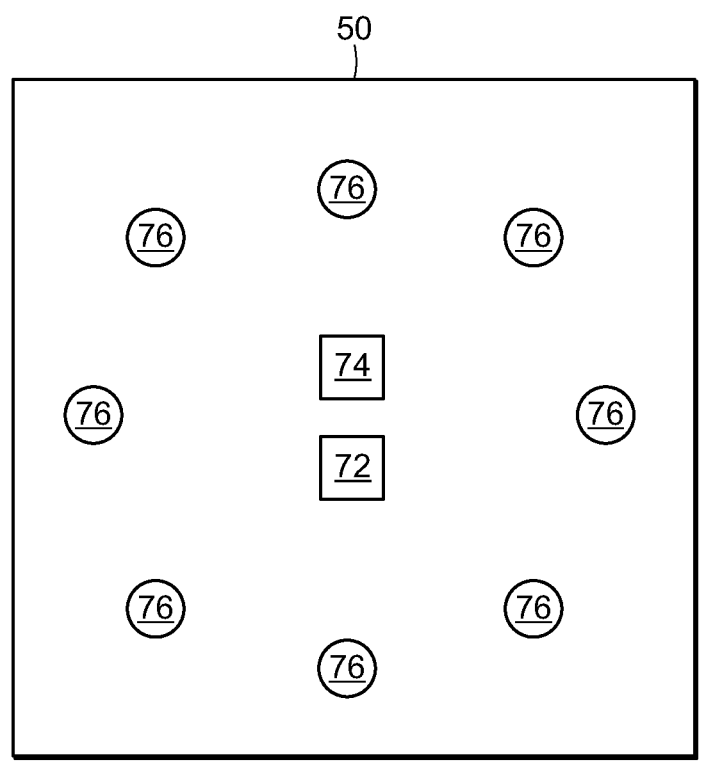
FIG. 9 shows an illustrative diagrammatic view of an underside of a perception system of FIGS. 2 and 3.

As discussed above, the system of an embodiment includes a perception system (e.g., 50) that is mounted above a bin of objects to be processed next to the base of the articulated arm 40, looking down into a bin 32. The system 50, for example and as shown in FIG. 9, may include (on the underside thereof), a camera 72, a depth sensor 74 and lights 76. A combination of 2D and 3D (depth) data is acquired. The depth sensor 74 may provide depth information that may be used together with the camera image data to determine depth information regarding the various objects in view. The lights 76 may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

Figure 10:
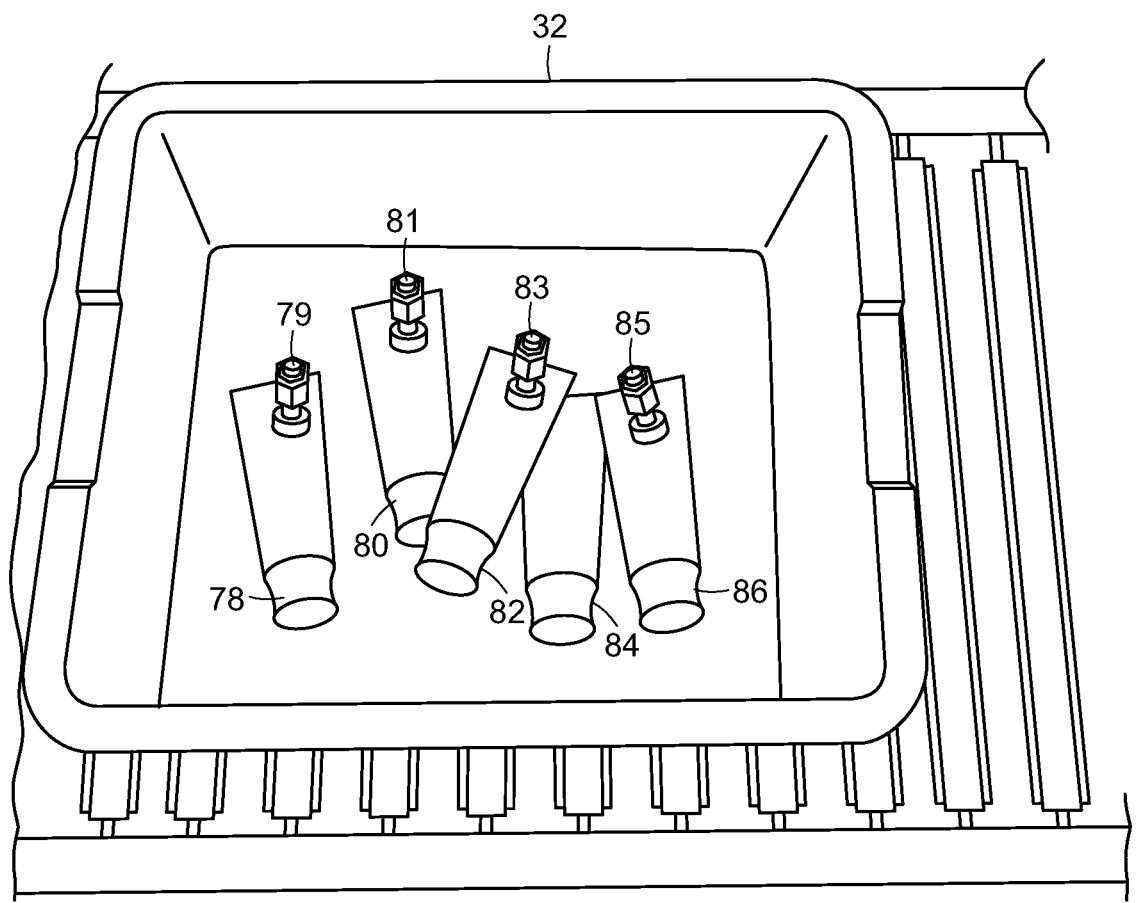
FIG. 10 shows an illustrative diagrammatic view from the perception system of FIG. 9, showing a view of objects within a bin of objects to be processed.

FIG. 10 shows an image view from the perception unit 50. The image view shows a bin 32 in an input area (a conveyor), and the bin 32 contains objects 78, 80, 82, 84 and 86. In the present embodiment, the objects are homogenous, and are intended for distribution to different break-pack packages. Superimposed on the objects 78, 80, 82, 84, 86 (for illustrative purposes) are anticipated grasp locations 79, 81, 83 and 85 of the objects. Note that while candidate grasp locations 79, 83 and 85 appear to be good grasp locations, grasp location 81 does not because its associated object is at least partially underneath another object. The system may also not even try to yet identify a grasp location for the object 84 because the object 84 is too obscured by other objects. Candidate grasp locations may be indicated using a 3D model of the robot end effector placed in the location where the actual end effector would go to use as a grasp location as shown in FIG. 6. Grasp locations may be considered good, for example, if they are close to the center of mass of the object to provide greater stability during grasp and transport, and/or if they avoid places on an object such as caps, seams etc. where a good vacuum seal might not be available.

If an object cannot be fully perceived by the detection system, the perception system considers the object to be two different objects, and may propose more than one candidate grasps of such two different objects. If the system executes a grasp at either of these bad grasp locations, it will either fail to acquire the object due to a bad grasp point where a vacuum seal will not occur (e.g., on the right), or will acquire the object at a grasp location that is very far from the center of mass of the object (e.g., on the left) and thereby induce a great deal of instability during any attempted transport. Each of these results is undesirable.

If a bad grasp location is experienced, the system may remember that location for the associated object. By identifying good and bad grasp locations, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

Figure 11A:
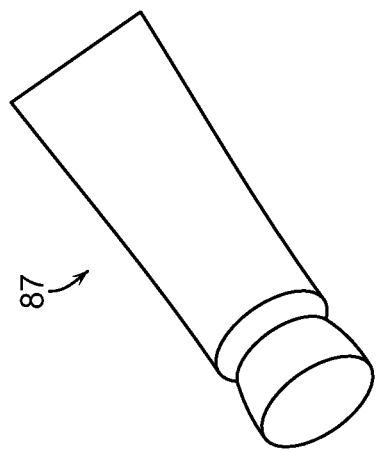
FIGS. 11A and 11B show an illustrative diagrammatic view of a grasp selection process in an object processing system of an embodiment of the present invention.
Figure 11B:
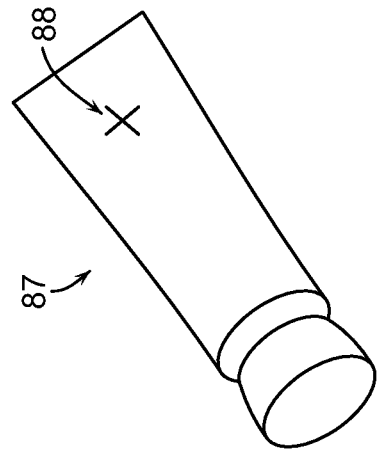

As shown in FIGS. 11A and 11B, the perception system may also identify portions of an object that are the most flat in the generation of good grasp location information. In particular, if an object includes a tubular end and a flat end such as object 87, the system would identify the more flat end as shown at 88 in FIG. 11B. Additionally, the system may select the area of an object where a UPC code appears, as such codes are often printed on a relatively flat portion of the object to facilitate scanning of the barcode.

Figure 13A:
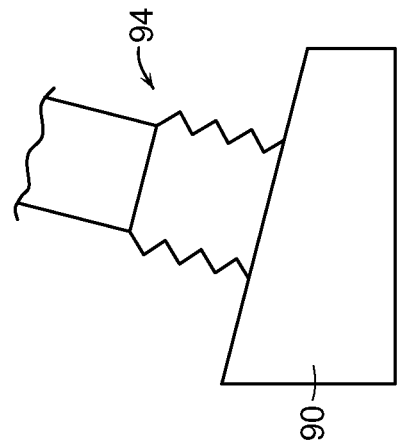
FIGS. 13A and 13B show an illustrative diagrammatic view of a grasp execution process in an object processing system of an embodiment of the present invention.
Figure 13B:
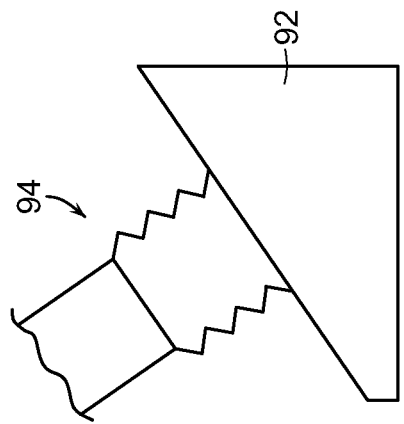
Figure 12A:
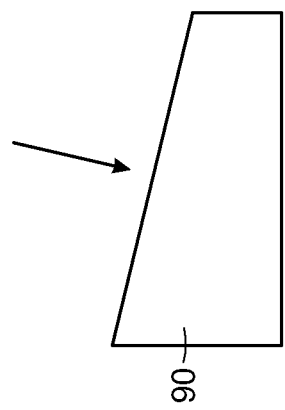
FIGS. 12A and 12B show an illustrative diagrammatic view of a grasp planning process in an object processing system of an embodiment of the present invention.
Figure 12B:
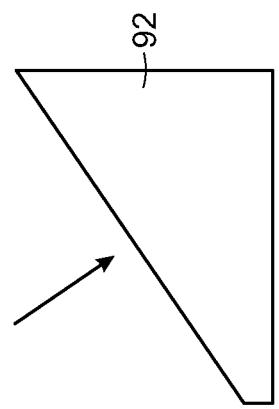

FIGS. 12A and 12B show that for each object 90, 92, the grasp selection system may determine a direction that is normal to the selected flat portion of the object 90, 92. As shown in FIGS. 13A and 13B, the robotic system will then direct the end effector 94 to approach each object 90, 92 from the direction that is normal to the surface in order to better facilitate the generation of a good grasp on each object. By approaching each object from a direction that is substantially normal to a surface of the object, the robotic system significantly improves the likelihood of obtaining a good grasp of the object, particularly when a vacuum end effector is employed.

The invention provides therefore in certain embodiments that grasp optimization may be based on determination of surface normal, i.e., moving the end effector to be normal to the perceived surface of the object (as opposed to vertical or gantry picks), and that such grasp points may be chosen using fiducial features as grasp points, such as picking on a barcode, given that barcodes are almost always applied to a flat spot on the object.

In accordance with various embodiments therefore, the invention further provides a processing system that may learn object grasp locations from experience (and optionally human guidance). Systems designed to work in the same environments as human workers will face an enormous variety of objects, poses, etc. This enormous variety almost ensures that the robotic system will encounter some configuration of object(s) that it cannot handle optimally; at such times, it is desirable to enable a human operator to assist the system and have the system learn from non-optimal grasps.

The system optimizes grasp points based on a wide range of features, either extracted offline or online, tailored to the gripper's characteristics. The properties of the suction cup influence its adaptability to the underlying surface, hence an optimal grasp is more likely to be achieved when picking on the estimated surface normal of an object rather than performing vertical gantry picks common to current industrial applications.

In addition to geometric information the system uses appearance-based features as depth sensors may not always be accurate enough to provide sufficient information about graspability. For example, the system can learn the location of fiducials such as barcodes on the object, which can be used as indicator for a surface patch that is flat and impermeable, hence suitable for a suction cup. One such example is the use of barcodes on consumer products. Another example is shipping boxes and bags, which tend to have the shipping label at the object's center of mass and provide an impermeable surface, as opposed to the raw bag material, which might be slightly porous and hence not present a good grasp.

By identifying bad or good grasp points on the image, a correlation is established between features in the 2D/3D imagery and the idea of good or bad grasp points; using this data and these correlations as input to machine learning algorithms, the system can eventually learn, for each image presented to it, where to grasp and where to avoid.

This information is added to experience based data the system collects with every pick attempt, successful or not. Over time the robot learns to avoid features that result in unsuccessful grasps, either specific to an object type or to a surface/material type. For example, the robot may prefer to avoid picks on shrink wrap, no matter which object it is applied to, but may only prefer to place the grasp near fiducials on certain object types such as shipping bags.

This learning can be accelerated by off-line generation of human-corrected images. For instance, a human could be presented with thousands of images from previous system operation and manually annotate good and bad grasp points on each one. This would generate a large amount of data that could also be input into the machine learning algorithms to enhance the speed and efficacy of the system learning.

In addition to experience based or human expert based training data, a large set of labeled training data can be generated based on a detailed object model in physics simulation making use of known gripper and object characteristics. This allows fast and dense generation of graspability data over a large set of objects, as this process is not limited by the speed of the physical robotic system or human input.

Figure 14:
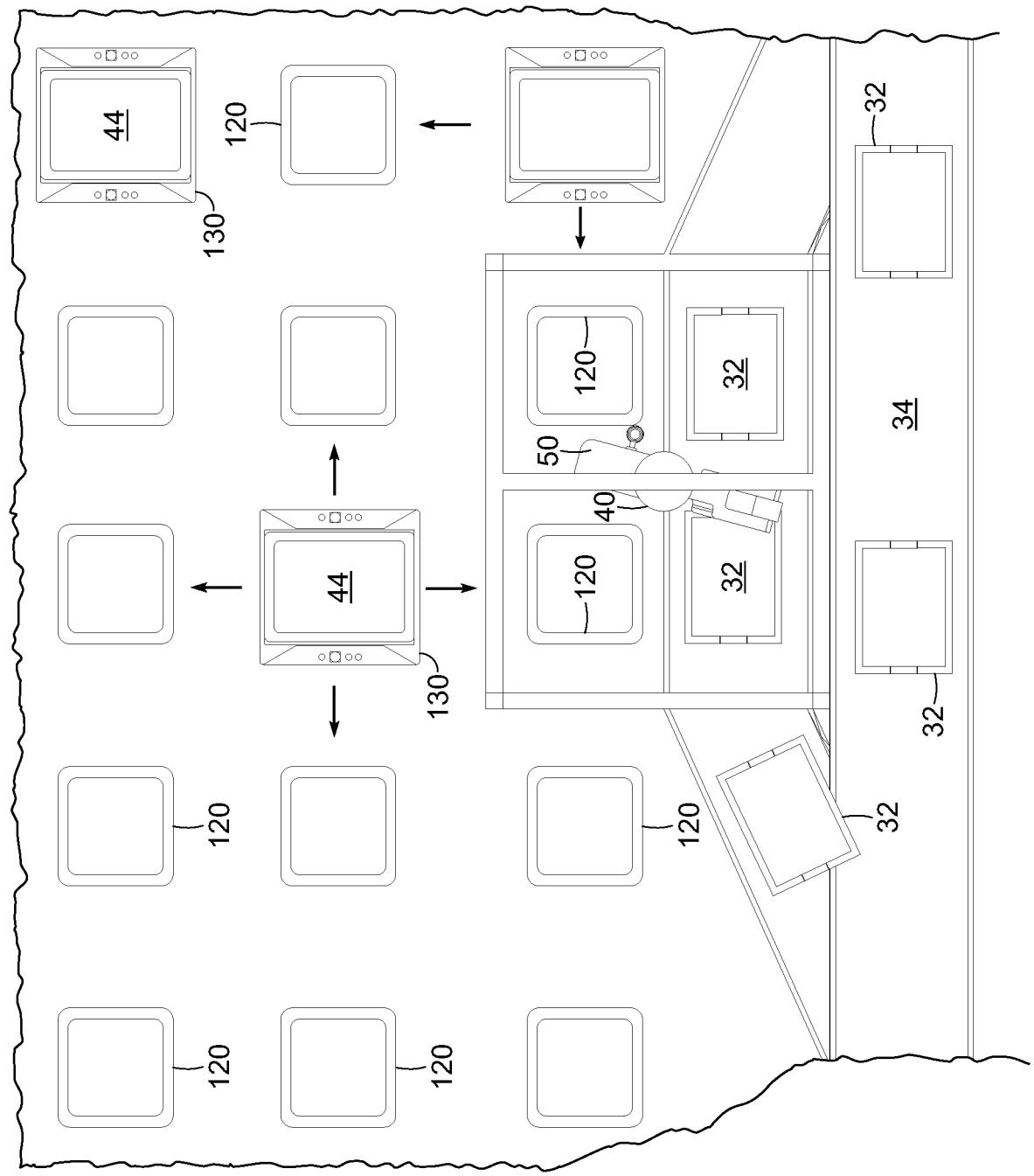
FIG. 14 shows an illustrative diagrammatic view of an object processing system in accordance with a further embodiment of the present invention.
Figure 15:
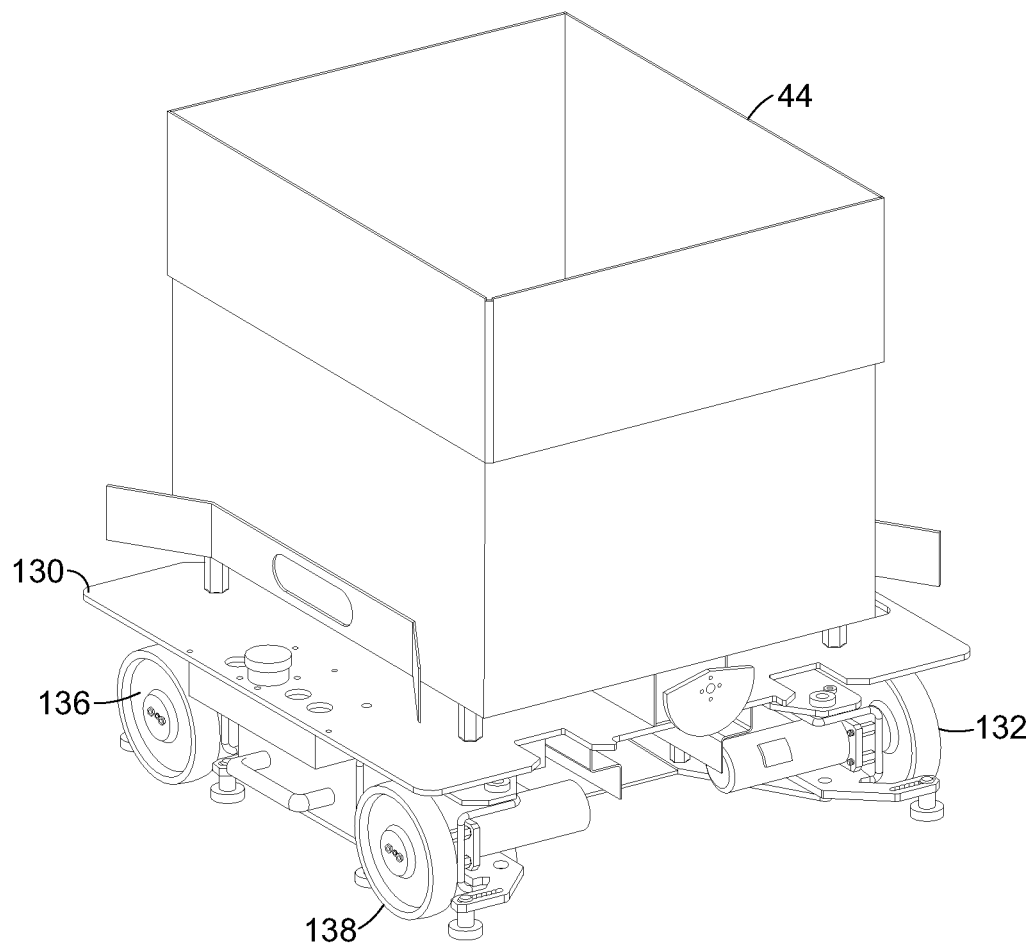
FIG. 15 shows an illustrative diagrammatic view of a further carrier and bin in an object processing system of FIG. 14.

In accordance with a further embodiment, the system may include one or more mobile carrier units 130 that carry a bin 44 as shown in FIG. 14. Each track 120 is generally in the form of a raised square with rounded edges, and the tracks 120 are generally closed spaced from each other (e.g., within a length or width of a mobile carrier unit 130). With reference to FIG. 15, each mobile carrier unit 130 may support a bin 44 that may contain objects to be processed or that have been processed. A computer processor 70 may control the movement of each carrier unit 130 by wireless communication. The tracks 120 may also include sensors (as discussed further below) for detecting when each carrier unit 130 is positioned above each individual track 120.

Each mobile carrier unit 130 includes a pair of guide rails 142, 144 that contain the bin 44, as well as a raised region 146 that raises the bin sufficient for there to be room on either side of the raised region for shelf forks to engage the bin as will be further discussed below. Each carrier unit 130 also includes four wheel assemblies 132, 134, 136, 138 that each include guides 140 for following the tracks 120. Each of the wheel assemblies is pivotally mounted such that each wheel assembly may pivot 90 degrees as discussed below. Each carrier unit 130 also includes a pair of paddles 148, 150 on either end of the unit 130. Each paddle may be turned either upward to contain a bin on the unit, or turned downward to permit a bin to be loaded onto or removed from the unit as will also be discussed in more detail below.

Figure 16A:
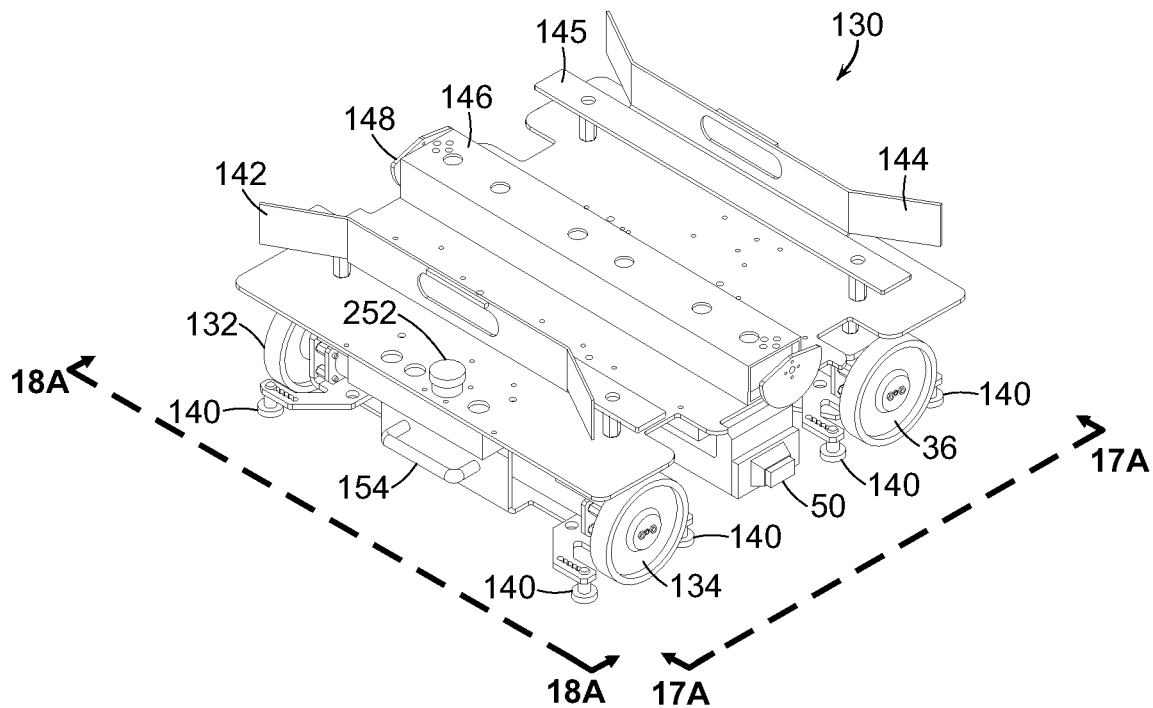
FIGS. 16A and 16B show illustrative diagrammatic isometric views of the carrier of FIG. 15 with the wheel assemblies in each of two different pivotal positions.
Figure 16B:
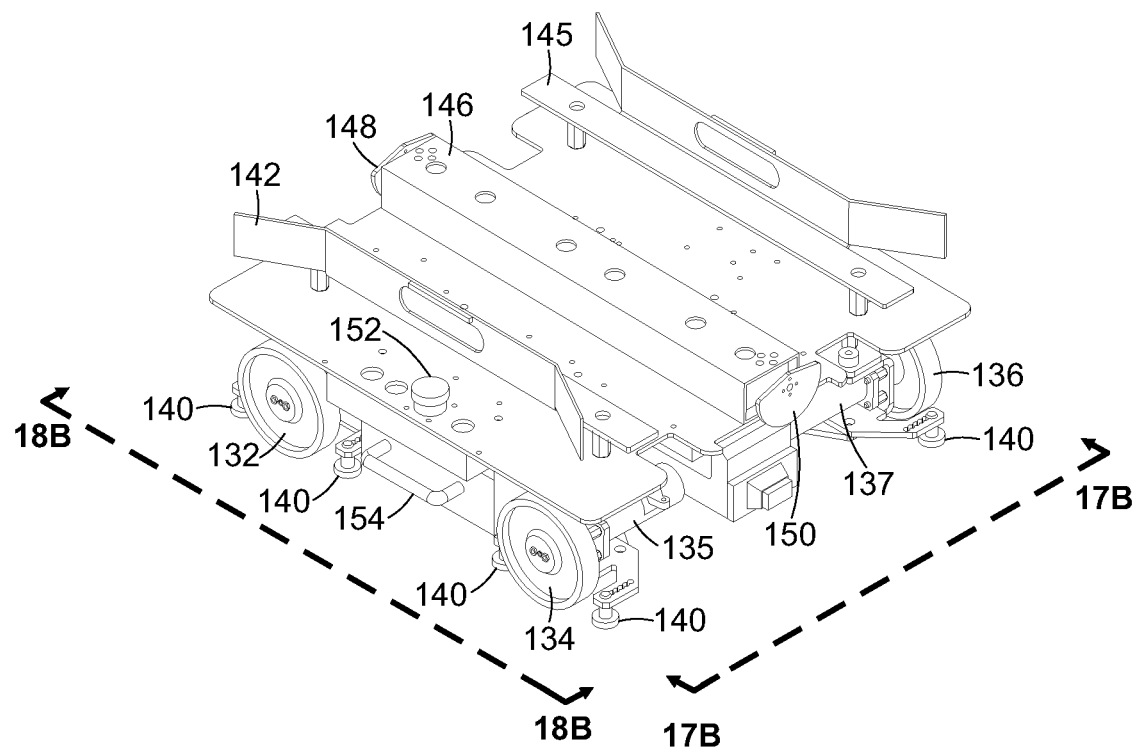
Figure 17A:
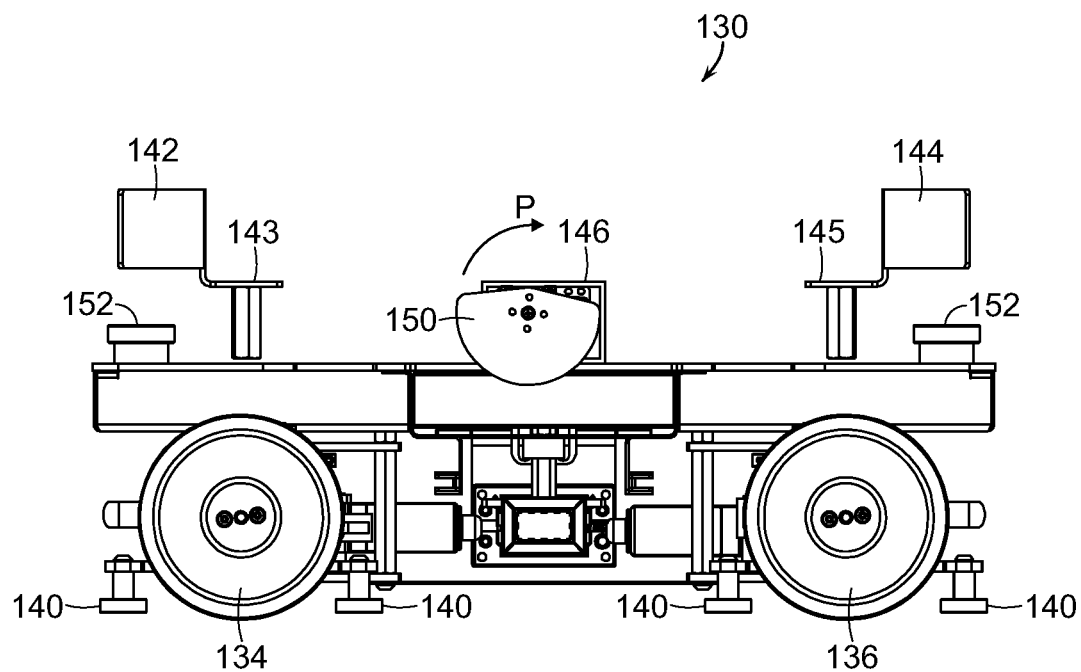
FIGS. 17A and 17B show illustrative diagrammatic side views of the carrier shown in FIGS. 16A and 16B taken along lines 17A-17A and 17B-17B respectively.
Figure 17B:
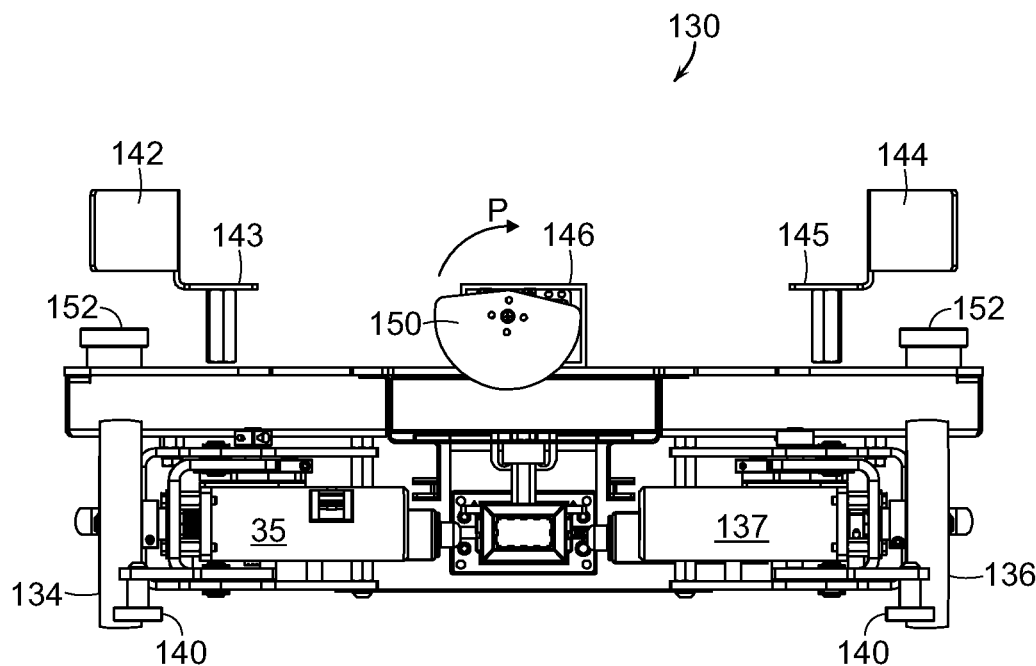
Figure 18A:
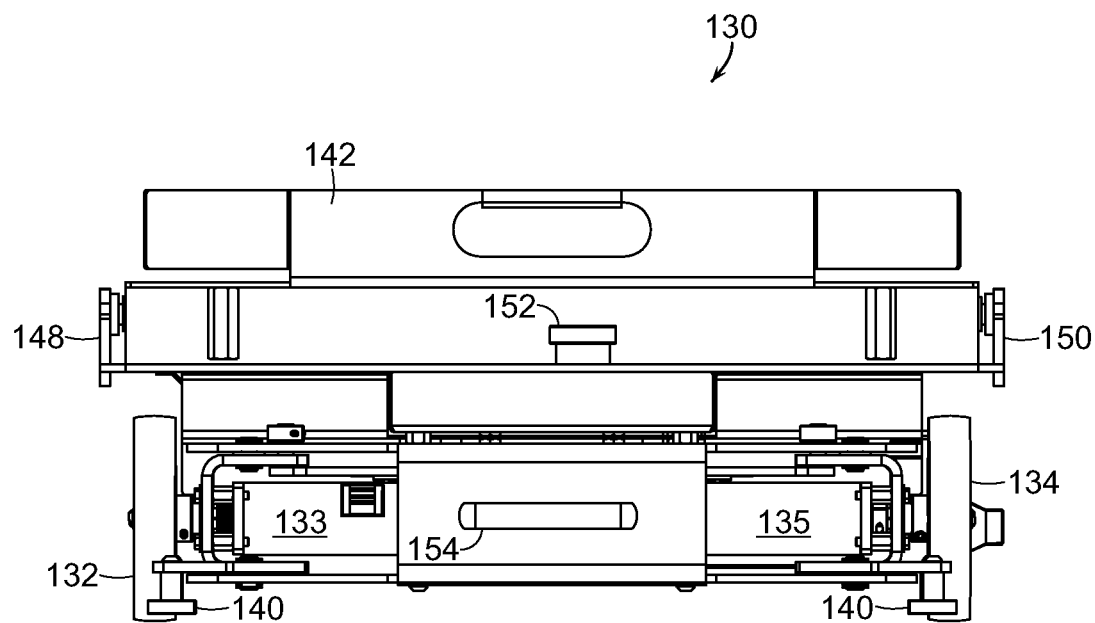
FIGS. 18A and 18B show illustrative diagrammatic end views of the carrier shown in FIGS. 16A and 16B taken along lines 18A-18A and 18B-18B respectively.
Figure 18B:
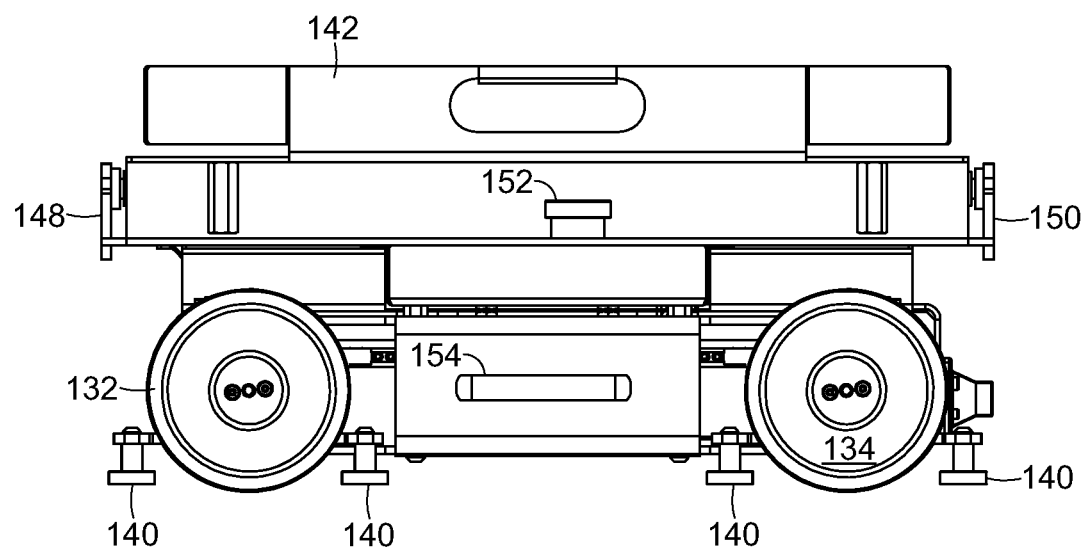

In accordance with certain embodiments therefore, the invention provides a plurality of mobile carriers that may include swivel mounted wheels that rotate ninety degrees to cause each mobile carrier to move forward and backward, or to move side to side. When placed on a grid, such mobile carriers may be actuated to move to all points on the grid. FIGS. 16A and 16B, for example, show a mobile carrier 130 that includes wheels 132, 134, 136 and 138 (shown in FIGS. 19A and 19B). Each of the wheels is mounted on a motor 133, 135, 137, 139 (as best shown in FIG. 19B), and the wheel and motor units (wheel assemblies) are pivotally mounted to the carrier 130 as discussed in more detail below. The wheel assemblies (each including a wheel, its motor and track guides 140) are shown in one position in FIG. 16A, and are shown in a second pivoted position in FIG. 16B. FIG. 17A shows an end view of the carrier 130 taken along lines 17A-17A of FIG. 16A, and FIG. 17B shows an end view of the carrier 130 taken along lines 17B-17B of FIG. 26B. Similarly, FIG. 18A shows a side view of the carrier 130 taken along lines 18A-18A of FIG. 16A, and FIG. 18B shows a side view of the carrier 130 taken along lines 18B-18B of FIG. 16B.

Each carrier 130 also includes a pair of opposing rails 142, 144 for retaining a bin, as well as a raised center portion 146 and stands 143, 145 on which a bin may rest. A pair of independently actuated paddles 148, 150 are also provided. Each paddle 148, 150 may be rotated upward (as shown at P in FIG. 17A) to retain a bin on the carrier, or may rotated downward to permit a bin to be moved onto or off of a carrier. The paddles 148, 150 are shown rotated downward in FIGS. 16A-18B.

Note that the orientation of the carrier 130 (also a bin on the carrier) does not change when the carrier changes direction. Again, a bin may be provided on the top side of the carrier, and may be contained by bin rails 142, 144 on the sides, as well actuatable paddles 148, 150. As will be discussed in further detail below, each paddle 148, 150 may be rotated 180 degrees to either urge a bin onto or off of a shelf, or (if both are actuated) to retain a bin on the carrier during transport. Each paddle may therefore be used in concert with movement of the carrier to control movement of the bin with respect to the carrier 130. For example, when one paddle is flipped into an upward position, it may be used to urge the bin onto a shelf or rack while the carrier is moving toward the shelf or rack. Each carrier may also include one or more emergency stop switches 152 for a person to use to stop the movement of a carrier in an emergency, as well as handles 154 to enable a person to lift the carrier if needed.

Figure 19A:
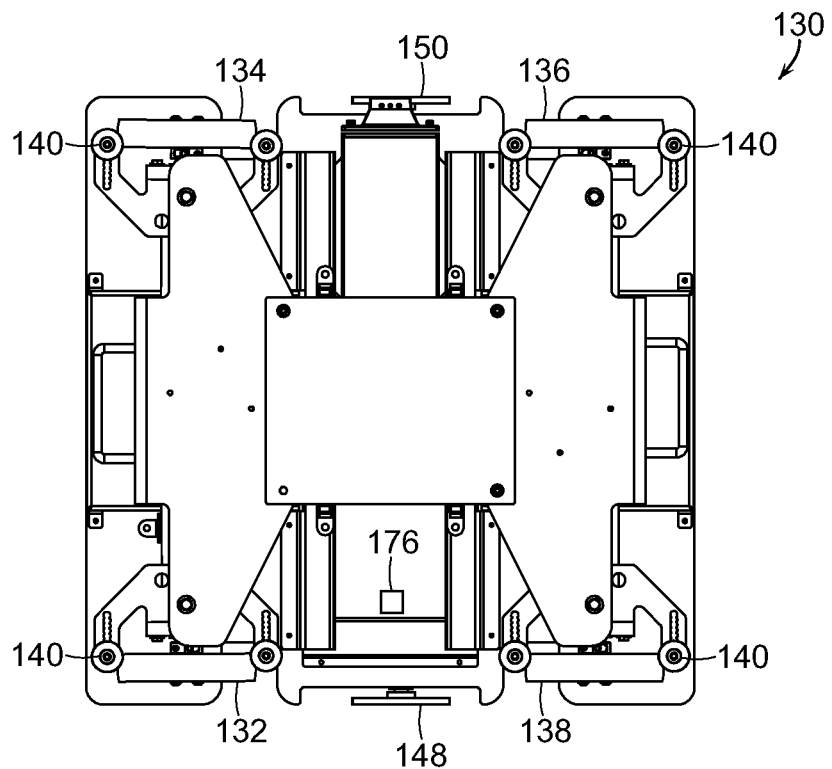
FIGS. 19A and 19B show illustrative diagrammatic bottom views of the carrier shown in FIGS. 16A and 16B respectively.
Figure 19B:
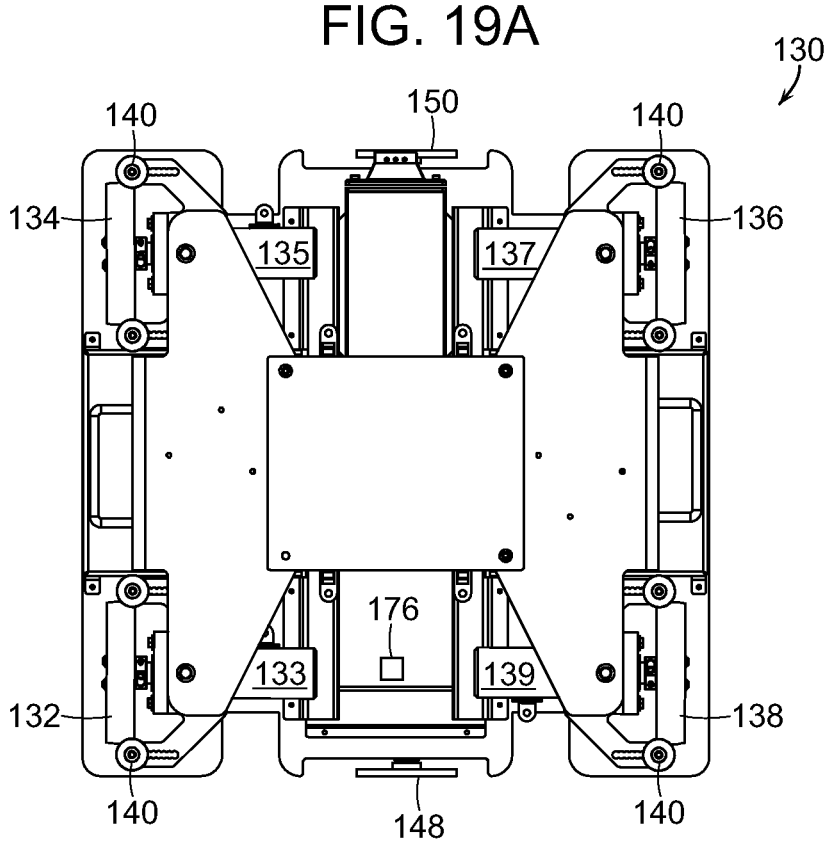
Figure 20A:
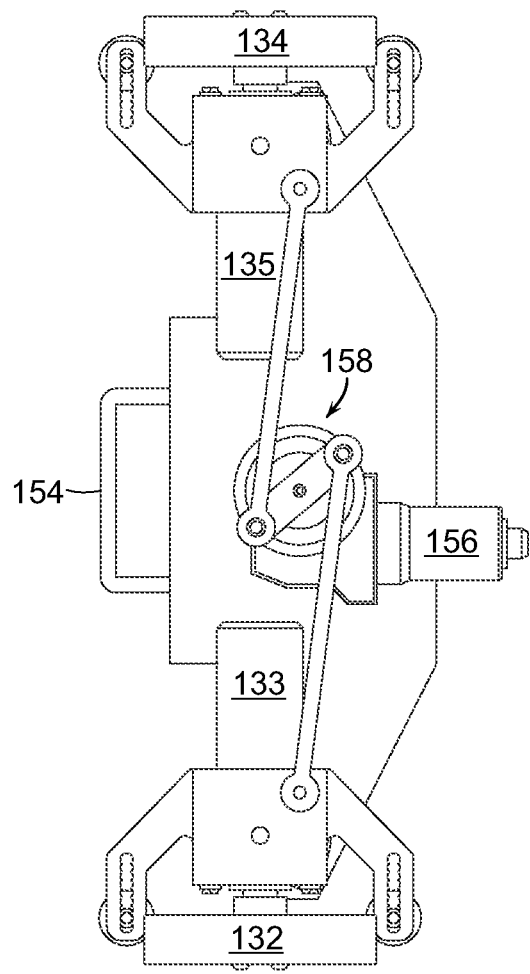
FIGS. 20A and 20B show illustrative diagrammatic views of pivotal wheel assemblies for use in a carrier of an embodiment of the present invention in each of two positions.
Figure 20B:
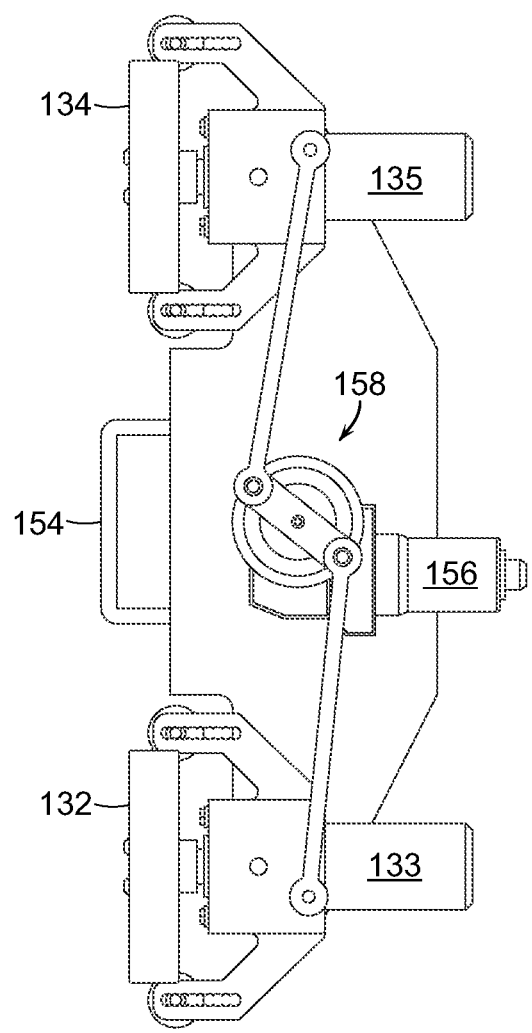
Figure 21A:
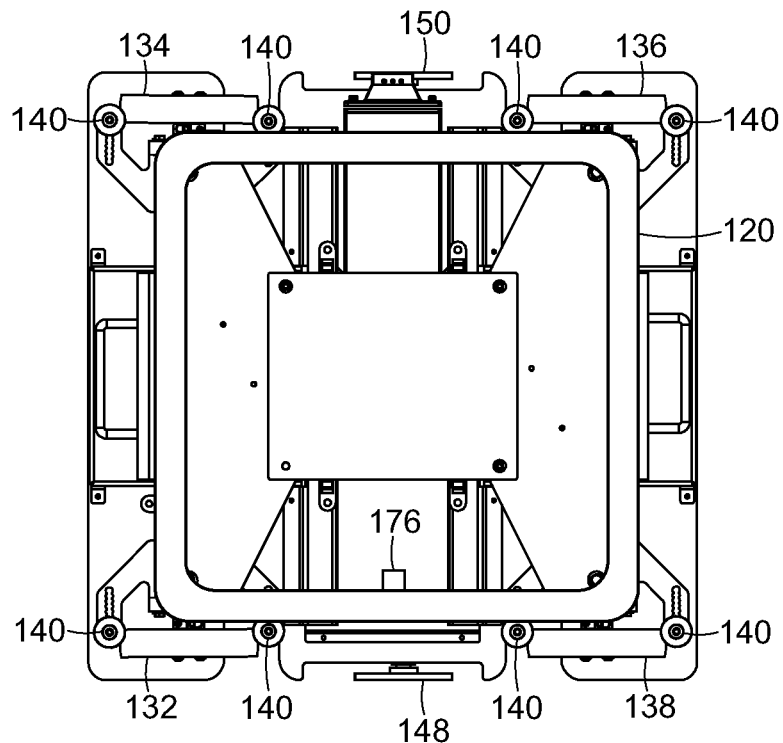
FIGS. 21A and 21B show illustrative diagrammatic bottom views of the carrier shown in FIGS. 19A and 19B respectively with track sections superimposed thereon for illustrative purposes.
Figure 21B:
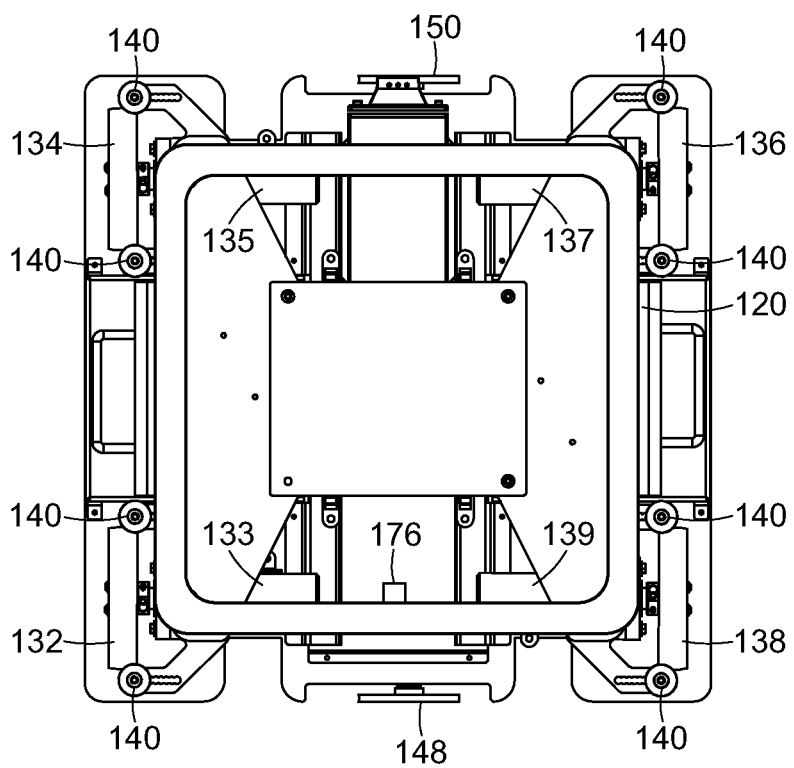

FIG. 19A shows a bottom view of the carrier 130 with the wheels in the position as shown in FIG. 16A, and FIG. 19B shows a bottom view of the carrier 130 with the wheels in the position as shown in FIG. 16B. FIGS. 19A and 19B show all of the wheels 132, 134, 136 and 138, and each of the motors 133, 135, 137 and 138 is also shown in FIG. 19B. As may be seen in FIGS. 19A and 19B, the entire wheel assemblies including the wheel, guide rollers and the wheel motor, each pivot as a unit. With reference to FIGS. 20A and 20B, each pair of wheel assemblies may, in an embodiment, be pivoted by a common pivot motor 156 that is coupled to the wheel assemblies via linkages 158. FIG. 20A shows a pair of wheel assemblies in a position as shown in FIG. 16A, and FIG. 20B shows the pair of wheel assemblies in a position as shown in FIG. 16B. The wheel assemblies are designed to be able to pivot the wheels around corners of a track section when the carrier is directly above a track section. FIGS. 21A and 21B show views similar to the underside views of FIGS. 19A and 19B but with a track 120 superimposed on the Figures to show the relation of the wheel positions to the track section. Note that the wheels pivot around each of the corners of the track section. When the carrier is centered over the track section, therefore, the wheels may be pivoted such that the carrier may move in a direction that is orthogonal to a prior direction without requiring that the carrier itself be turned. The orientation of the carrier is therefore maintained constant while the carrier is moved about an array of tracks sections.

Figure 22A:
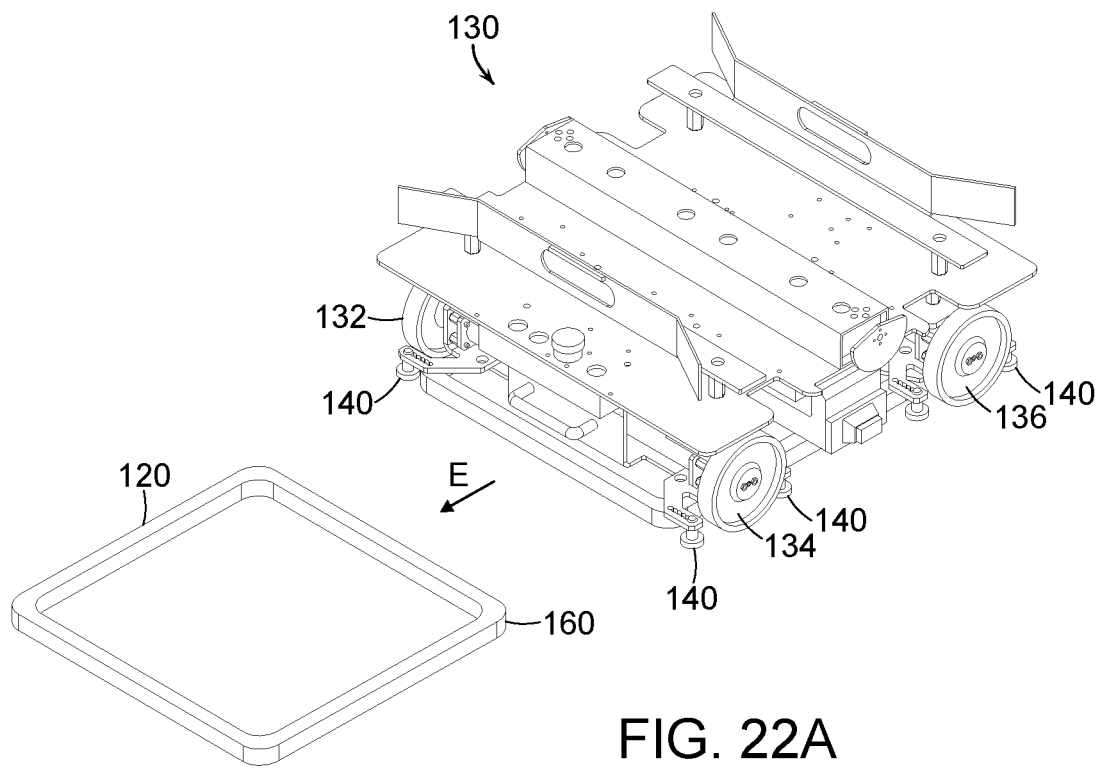
FIGS. 22A-22C show illustrative diagrammatic views of the carrier of FIG. 15 at different stages of engaging an adjacent track section during movement.
Figure 22B:
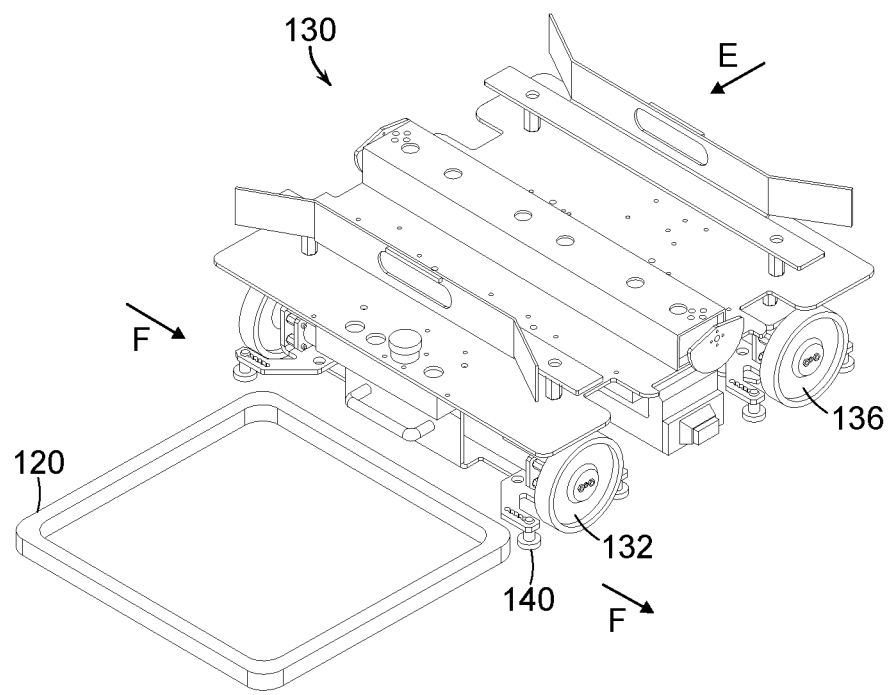

The movement of the carrier 130 about an array of tracks is further discussed below with regard to FIGS. 22A-22C. In short as a carrier leaves one track, it travels toward an adjacent track, and if at all misaligned, will realign itself. The realignment of the guide rollers and the tracks may function as follows. While the two sets of wheels (132, 134 and 136, 138) may be designed to move the carrier 130 in a linear direction only, some variations may occur. The tracks 120 are positioned, though intermittently, close enough to each other than when a carrier leaves one track and moves toward another 120 (as shown at E), its potential variation off course will be small enough that the rounded corners of the next adjacent track will urge the carrier back on course. For example, FIG. 22A shows a carrier 130 leaving a track and beginning to approach a next track 120 as the carrier moves in a direction as indicated at E. As shown in FIG. 22B, if the alignment of the carrier 130 is off (possibly from variations in the wheels or the mounting of the wheels, the placement of the track sections or any other variable), one of the rounded corners 160 of next adjacent track 120 will become engaged by an on-coming guide wheel 140, and the rounded corner 160 will cause the carrier 130 to move slightly in a direction (as shown at F) perpendicular to the direction E to correct the direction of movement of the carrier 130. If a carrier does stop moving, the directions of movement of the other carriers are programmed to avoid the area of the stopped carrier until it is removed. If an area results in a number of stopped carriers over time, the alignment of the track(s) in the area may be examined and/or replaced.

Figure 22C:
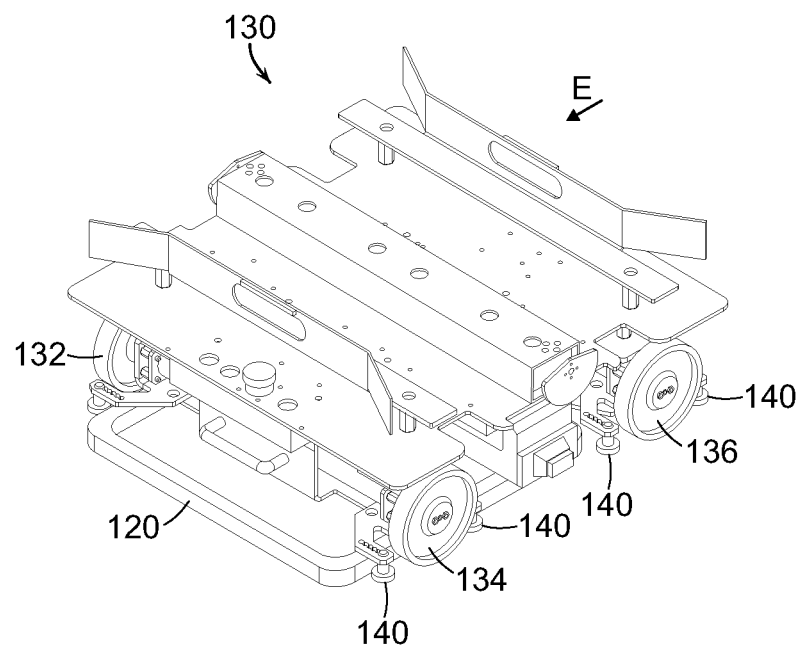
Figure 23:
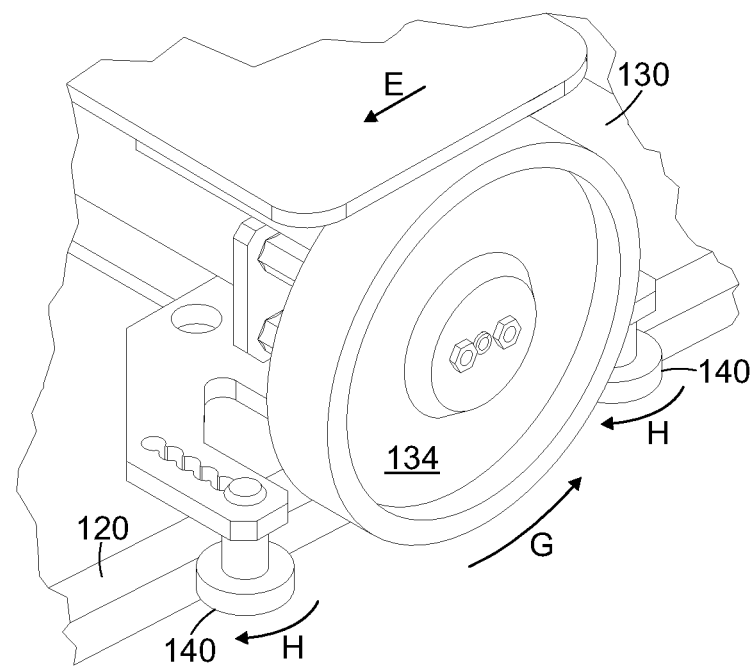
FIG. 23 shows an illustrative diagrammatic view of guide rollers of the carrier of FIG. 15 engaging a track section.

FIG. 22C shows the carrier 130 moving in a direction E as properly realigned by the track 120. FIG. 23 shows a close up view of the wheel 134 moving in a direction as shown at G to cause the carrier to move in the direction E, and further shows that the guide rollers 140 roll against the track 120 in directions as shown at H. The guide rollers 140 do not touch the ground (as does the wheel 134), but simply guide the direction of the carrier 130 by being urged against the track 120. In further embodiments, biasing means such as springs, elastics or pneumatics may be used to urge the guide rollers against the track, and in further embodiments, the tracks may be more triangular shaped at the edges to further facilitate reception of the carriers. If too much correction is required, however, the system may be operating inefficiently.

Systems of the invention therefore provide for binary steering of the automated carrier, allowing only bidirectional column and row travel in a grid. One pivot motor may be used for each pair of wheels, with a linkage to pivot the wheel modules. On other embodiments, one pivot motor and linkage could be used for all four wheels, or each wheel may have an independent pivot actuator. The system allows the wheels to follow square track sections by pivoting around rounded corners of the square track sections. The system does not require differential drive line/trajectory following, and keeps the orientation of the carrier fixed throughout all operations.

The system of an embodiment may also employ motion planning using a trajectory database that is dynamically updated over time, and is indexed by customer metrics. The problem domains contain a mix of changing and unchanging components in the environment. For example, the objects that are presented to the system are often presented in random configurations, but the target locations into which the objects are to be placed are often fixed and do not change over the entire operation.

One use of the trajectory database is to exploit the unchanging parts of the environment by pre-computing and saving into a database trajectories that efficiently and robustly move the system through these spaces. Another use of the trajectory database is to constantly improve the performance of the system over the lifetime of its operation. The database communicates with a planning server that is continuously planning trajectories from the various starts to the various goals, to have a large and varied set of trajectories for achieving any particular task. In various embodiments, a trajectory path may include any number of changing and unchanging portions that, when combined, provide an optimal trajectory path in an efficient amount of time.

Figure 24:
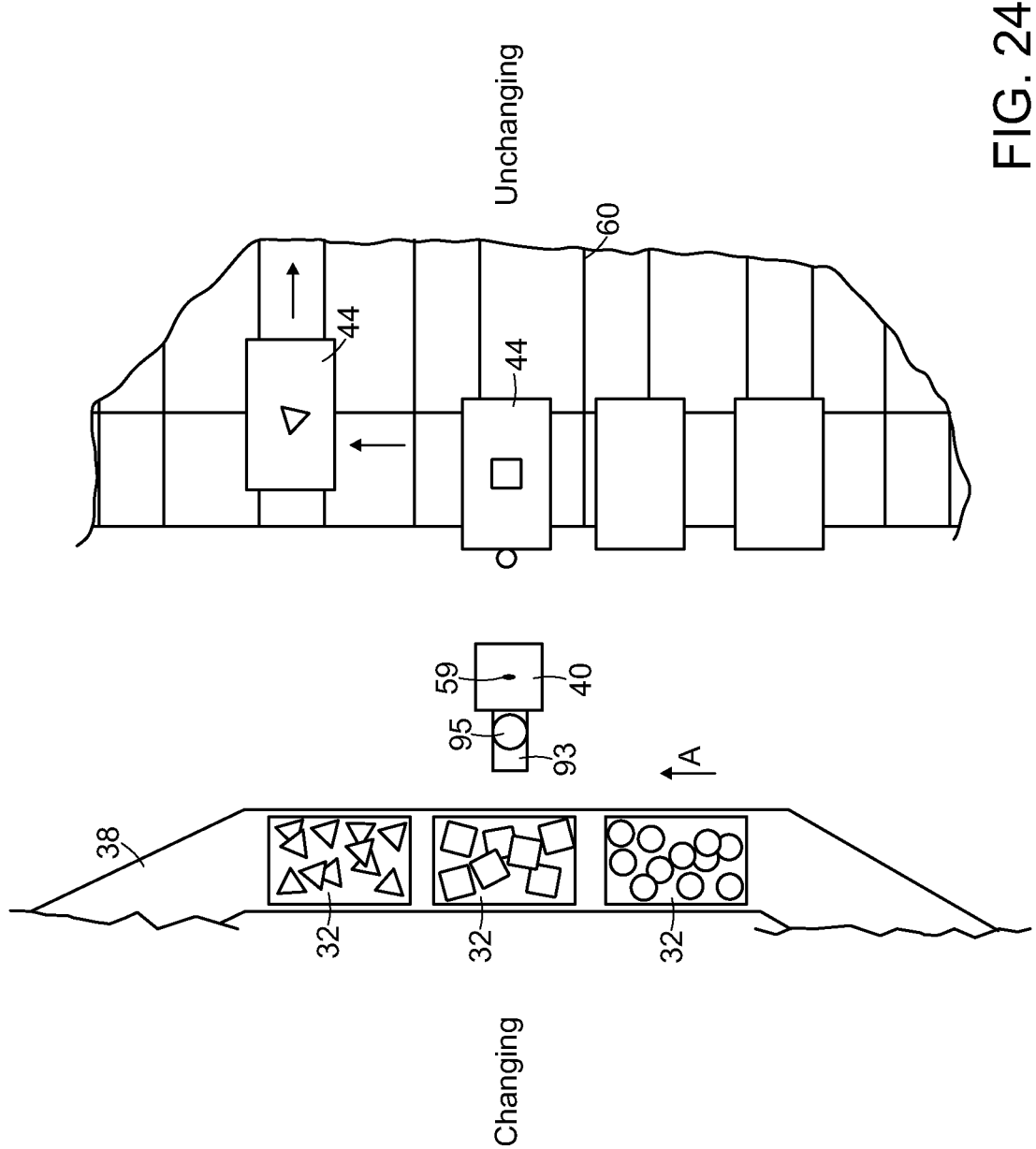
FIG. 24 shows an illustrative diagrammatic top view of an object processing system in accordance with another embodiment of the invention that identifies changing and unchanging motion planning general areas.

FIG. 24 for example, shows a diagrammatic view of a system in accordance with an embodiment of the invention that includes an input area conveyor 38 (moving in a direction as indicated at A) that provide input bins 32 to a programmable motion device (as shown diagrammatically at 40), such as an articulated arm, having a base as shown at 59, and an end effector (shown diagrammatically at 93) that is programmed to have a home position 95, and is programmed for moving objects from an input bin 32 to processing locations, e.g., destination locations at the plurality of packages 44. Again, the system may include a defined home or base location 95 to which each object may initially be brought upon acquisition from the bin 32. The system also includes a plurality of destination bins 44 on automated carriers on a track 60 as discussed above.

In certain embodiments, the system may include a plurality of base locations, as well as a plurality of predetermined path portions associated with the plurality of base locations. The trajectories taken by the articulated arm of the robot system from the input bin to the base location are constantly changing based in part, on the location of each object in the input bin, the orientation of the object in the input bin, and the shape, weight and other physical properties of the object to be acquired.

Once the articulated arm has acquired an object and is positioned at the base location, the paths to each of the plurality of destination bins 44 are not changing. In particular, each destination bin is associated with a unique destination bin location, and the trajectories from the base location to each of the destination bin locations individually is not changing. A trajectory, for example, may be a specification for the motion of a programmable motion device over time. In accordance with various embodiments, such trajectories may be generated by experience, by a person training the system, and/or by automated algorithms. For a trajectory that is not changing, the shortest distance is a direct path to the target destination bin, but the articulated arm is comprised of articulated sections, joints, motors etc. that provide specific ranges of motion, speeds, accelerations and decelerations. Because of this, the robotic system may take any of a variety of trajectories between, for example, base locations and destination bin locations.

Figure 25:
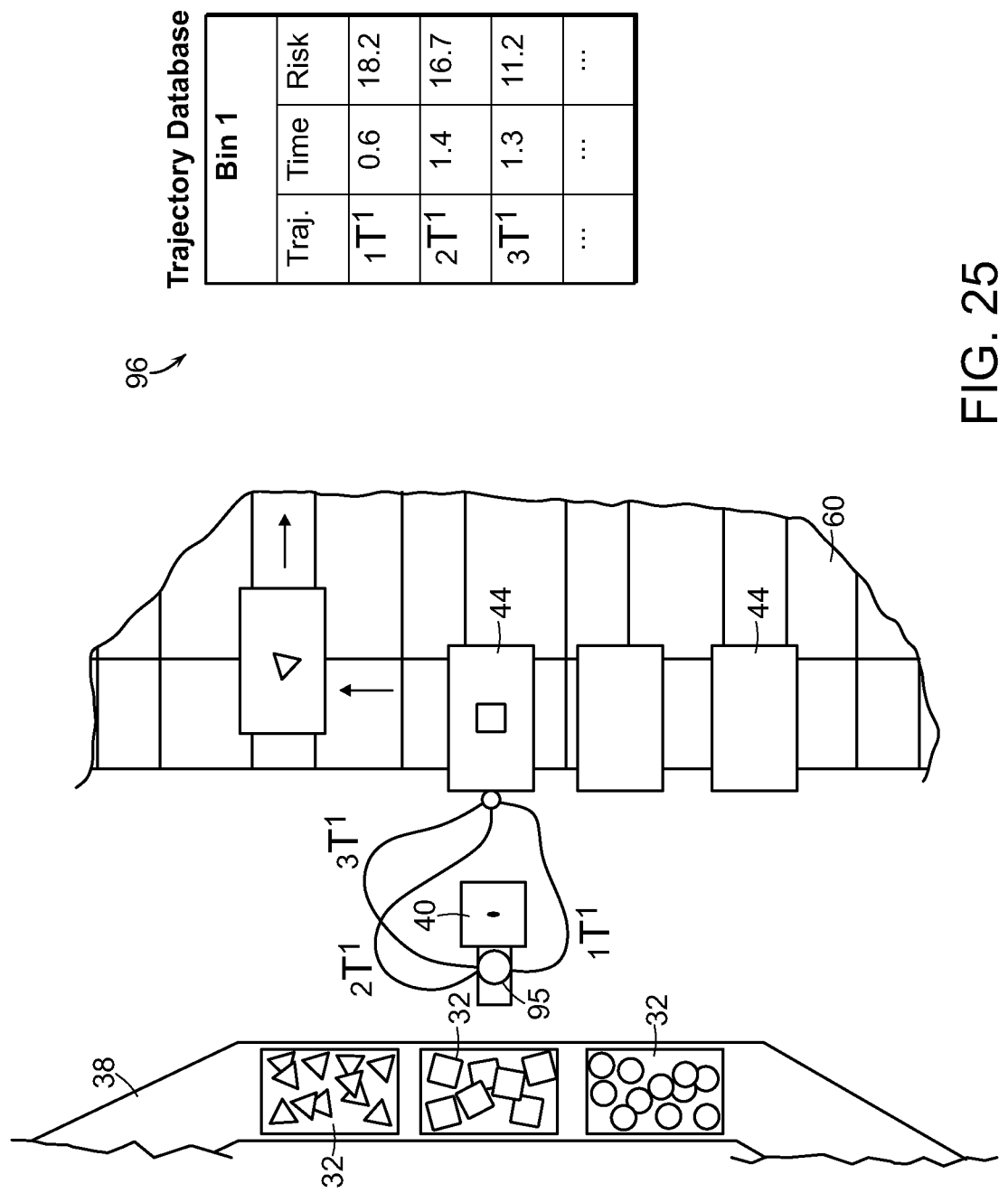
FIG. 25 shows an illustrative diagrammatic top view of the system of FIG. 24, showing multiple possible paths from the programmable motion device to a destination carrier.

FIG. 25 for example, shows three such trajectories ($_1T^1$, $_2T^1$ and $_3T^1$) between base location 95 and a destination bin location 44. The elements of FIG. 27 are the same as those of FIG. 26. Each trajectory will have an associated time as well as an associated risk factor. The time is the time it takes for the articulated arm of the robotic system to accelerate from the base location 95 move toward the destination bin 44, and decelerate to the destination bin location 44 in order to place the object in the destination bin 44.

The risk factor may be determined in a number of ways including whether the trajectory includes a high (as predefined) acceleration or deceleration (linear or angular) at any point during the trajectory. The risk factor may also include any likelihood that the articulated arm may encounter (crash into) anything in the robotic environment. Further, the risk factor may also be defined based on learned knowledge information from experience of the same type of robotic arms in other robotic systems moving the same object from a base location to the same destination location.

As shown in the table at 96 in FIG. 25, the trajectory $_1T^1$ from the base location 95 to the destination location 102 may have a fast time (0.6 s) but a high risk factor. The trajectory $_2T^1$ from the base location 95 to the destination location 44 may have a much slower time (1.4 s) but still a fairly high risk factor (16.7). The trajectory $_3T^1$ from the base location 95 to the destination location 102 may have a relatively fast time (1.3 s) and a moderate risk factor (11.2). The choice of selecting the fastest trajectory is not always the best as sometimes the fastest trajectory may have an unacceptably high risk factor. If the risk factor is too high, valuable time may be lost by failure of the robotic system to maintain acquisition of the object. Different trajectories therefore, may have different times and risk factors, and this data may be used by the system in motion planning.

Figure 26:
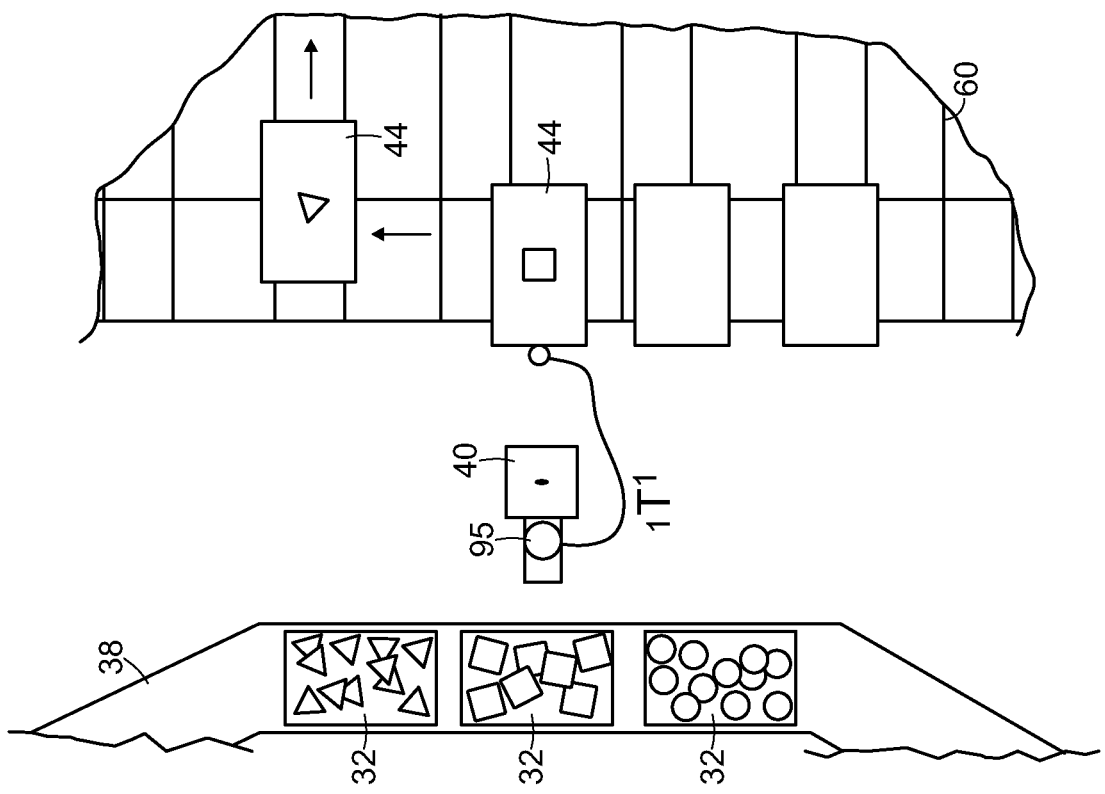
FIG. 26 shows an illustrative diagrammatic top view of the system of FIG. 24, showing a path from the programmable motion device to a destination carrier with an emphasis on minimum time.
Figure 27:
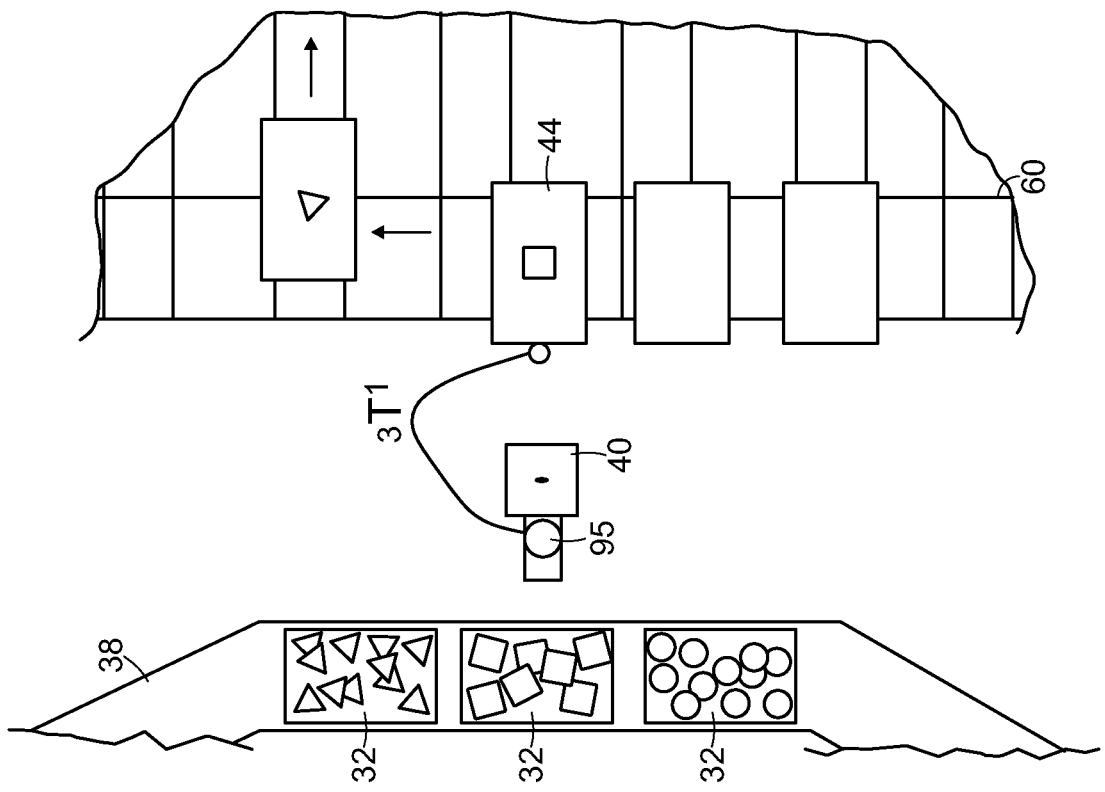
FIG. 27 shows an illustrative diagrammatic top view of the system of FIG. 24, showing a path from the programmable motion device to a destination carrier with an emphasis on minimum risk.

FIG. 26, for example, shows minimum time-selected trajectories from the base location 95 to each of destination bin location 44. In particular, the tables shown at 97 that the time and risk factors for a plurality of the destination bins, and the trajectories from the base location 95 to the destination bin location 44 are chosen to provide the minimum time for motion planning for motion planning under a risk factor of 14.0.

FIG. 27 shows minimum risk-factor-selected set of trajectories from the base location 95 to the destination bin location 44. Again, the tables shown at 97 show the time and risk factors for the plurality of the destination bins (e.g., 1-3). The trajectories from the base location 95 to the destination bin location 44 are chosen to provide the minimum risk factor for motion planning for motion planning under a maximum time of 1.2 seconds.

The choice of fast time vs. low risk factor may be determined in a variety of ways, for example, by choosing the fastest time having a risk factor below an upper risk factor limit (e.g., 12 or 14), or by choosing a lowest risk factor having a maximum time below an upper limit (e.g., 1.0 or 1.2). Again, if the risk factor is too high, valuable time may be lost by failure of the robotic system to maintain acquisition of the object. An advantage of the varied set is robustness to small changes in the environment and to different-sized objects the system might be handling: instead of re-planning in these situations, the system iterates through the database until it finds a trajectory that is collision-free, safe and robust for the new situation. The system may therefore generalize across a variety of environments without having to re-plan the motions.

Overall trajectories therefore, may include any number of changing and unchanging sections. For example, networks of unchanging trajectory portions may be employed as commonly used paths (roads), while changing portions may be directed to moving objects to a close-by unchanging portion (close road) to facilitate moving the object without requiring the entire route to be planned. For example, the programmable motion device (e.g., a robot) may be tasked with orienting the grasped object in front of an automatic labeler before moving towards the destination. The trajectory to sort the object therefore, would be made up of the following trajectory portions. First, a grasp pose to a home position (motion planned). Then, from home position to an auto-labeler home (pulled from a trajectory database). Then, from the auto-labeler home to a labelling pose (motion planned). Then, from the labelling pose to an auto-labeler home (either motion planned or just reverse the previous motion plan step). Then, from the auto-labeler home to the intended destination (pulled from the trajectory database). A wide variety of changing and unchanging (planned and pulled from a database) portions may be employed in overall trajectories. In accordance with further embodiments, the object may be grasped from a specific pose (planned), and when the object reaches a destination bin (from the trajectory database), the last step may be to again place the object in the desired pose (planned) within the destination bin.

In accordance with further embodiments, the motion planning may also provide that relatively heavy items (as may be determined by knowing information about the grasped object or by sensing weight—or both—at the end effector) may be processed (e.g., moved in trajectories) and placed in boxes in very different ways than the processing and placement of relatively light objects. Again, the risk verses speed calculations may be employed for optimization of moving known objects of a variety of weights and sizes as may occur, for example, in the processing of a wide variety of consumer products.

Figure 28:
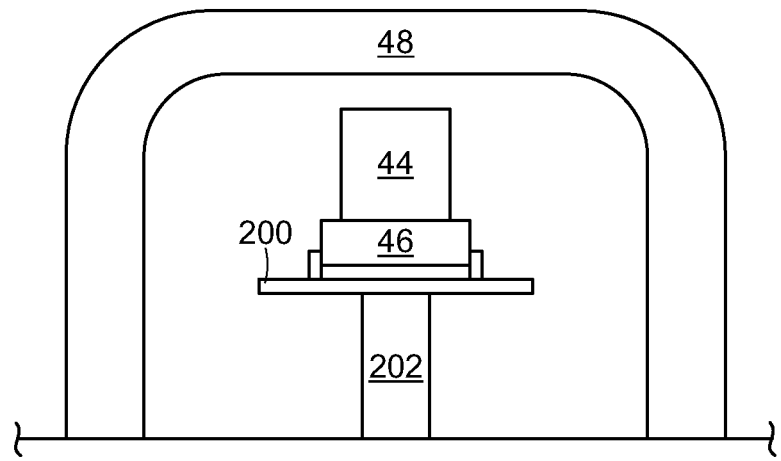
FIG. 28 shows an illustrative diagrammatic view of an output station for use in a system in accordance with an embodiment of the present invention.
Figure 29:
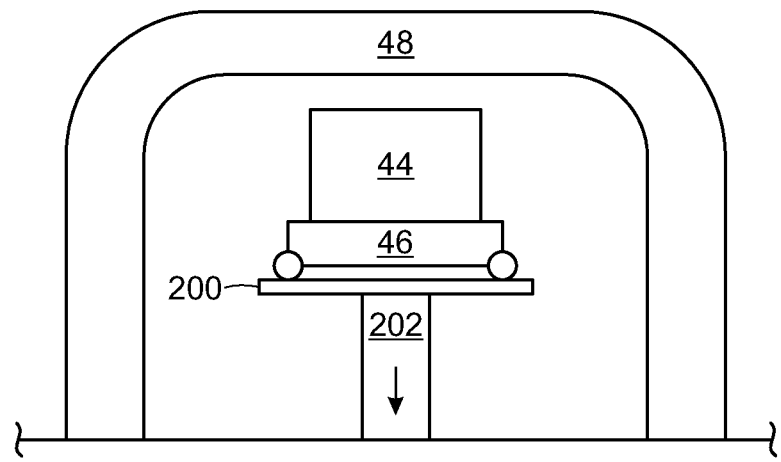
FIG. 29 shows an illustrative diagrammatic view of the output station of FIG. 28 with carrier and bin having been rotated.
Figure 30:
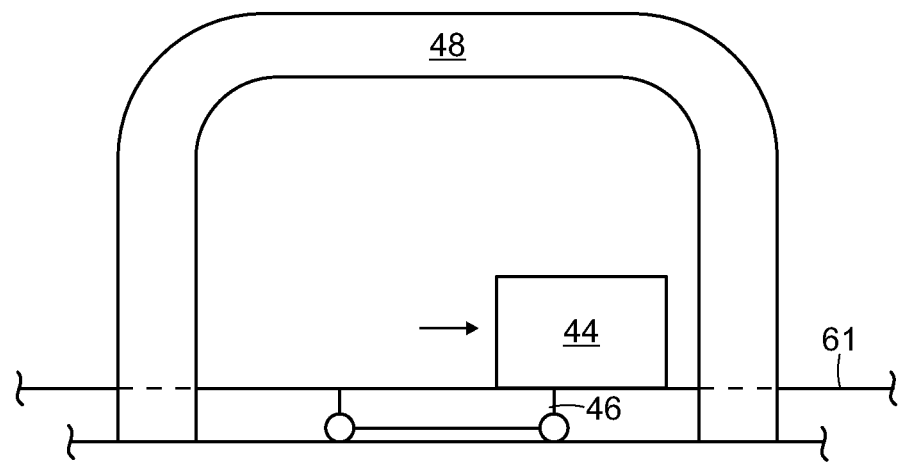
FIG. 30 shows an illustrative diagrammatic view of the output station of FIG. 28 also showing an output conveyor 61.
Figure 31:
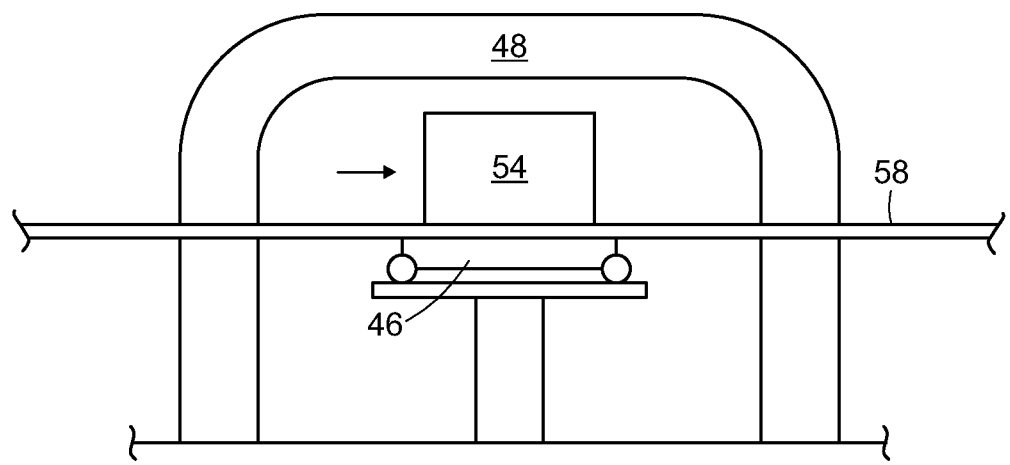
FIG. 31 shows an illustrative diagrammatic view of the output station of FIG. 28 showing a new bin replenishment conveyor.

The output stations 48 may include a platform 200 and lift 202 that receive mobile carriers and bins from the track 60 as shown in FIG. 28. The carrier 46 is optionally turned, and then lowered as shown in FIG. 29, and once lowered, the completed package 44 may be urged onto the output conveyor 61 as shown in FIG. 30. The lift 202 then raises the carrier 46, which engages a new empty package 54 as shown in FIG. 31. The packages 44 and 54 may be moved by actuated mechanisms or by a human worker moving the packages on and off the carriers and conveyors. The system 30 may include multiple such processing stations as well as multiple input conveyors and multiple output conveyors.

The system, therefore, provides means that interface with the customer's outgoing object conveyance systems. When a bin (or package) is full as determined by the system (in monitoring system operation), a human operator may pull the bin from the processing area, and place the bin in an appropriate conveyor. When a bin is full it gets removed to the closed/labelled area; another empty bin is immediately placed in the location freed up by the removed full bin, and the system continues processing as discussed above.

In accordance with a specific embodiment, the invention provides a user interface that conveys all relevant information to operators, management, and maintenance personnel. In a specific embodiment, this may include lights indicating bins that are about to be ejected (as full), bins that are not completely properly positioned, the in-feed hopper content level, and the overall operating mode of the entire system. Additional information might include the rate of object processing and additional statistics. In a specific embodiment, the system may automatically print labels and scan labels before the operator places the packages on an output conveyor. In accordance with a further embodiment, the system may incorporate software systems that interface with the customer's databases and other information systems, to provide operational information to the customer's system, and to query the customer's system for object information.

Those skilled in the art will appreciate that numerous modifications and variations may be made to the above disclosed embodiments without departing from the spirit and scope of the present invention.

What is claimed is:

1. A processing system, comprising:
a processing station;
a track system that comprises a plurality of intermittently disposed track sections, each of the plurality of intermittently disposed track sections having one of a rectangular shape and a triangular shape at the edges thereof; and
a plurality of automated carriers that move along the track system carrying a plurality of processing bins to and from the processing station,
wherein the processing station comprises a perception unit that perceives identifying indicia representative of an identity of an object among a plurality of objects received from an input conveyance system, and
wherein the processing station further comprises an articulated arm having an end effector that acquires the object from among the plurality of objects at an input area of the processing station and deposits the object into an identified processing bin moved along the track system to the processing station by one of the plurality of automated carriers, said identified processing bin being associated with the identifying indicia and said identified processing bin being provided as one of the plurality of processing bins.

2. The processing system as claimed in claim 1, wherein the input conveyance system includes a primary conveyor and an input area conveyor onto which the plurality of objects are diverted from the primary conveyor.

3. The processing system as claimed in claim 1, wherein the plurality of objects is provided in an input bin that is one of a plurality of input bins, each including a further plurality of objects.

4. The processing system as claimed in claim 1, wherein one or more of the plurality of automated carriers is movable in at least two dimensions along the track system.

5. The processing system as claimed in claim 1, wherein an assignment of a manifest for each processing bin is dynamically assigned.

6. The processing system as claimed in claim 1, further comprising an empty processing bin supply conveyance system for providing empty processing bins to one or more of the plurality of automated carriers.

7. The processing system as claimed in claim 1, wherein the processing station is provided as one of a plurality of processing stations that are each in communication with the input conveyance system.

8. The processing system as claimed in claim 1, further comprising an output conveyor onto which a completed processing bin is placed.

9. The processing system as claimed in claim 8, further comprising a processing bin exchanger for removing the completed processing bin from any of the plurality of automated carriers and for loading an empty processing bin onto any of the plurality of automated carriers.

10. The processing system as claimed in claim 1, wherein the plurality of intermittently disposed track sections comprises a plurality of raised track sections spaced apart from one another on a platform.

11. The processing system as claimed in claim 10, wherein each automated carrier includes a plurality of wheel assemblies that are pivotally mounted, each automated carrier being configured to move in a first direction from any track section to an adjacent track section when the plurality of wheel assemblies are rotated to a first pivot position and move in a second direction from any track section when the wheel assemblies are rotated to a second pivot position, wherein the first direction is orthogonal to the second direction.

12. A processing system, comprising:
a plurality of processing stations;
a track system that comprises a plurality of intermittently disposed track sections, each of the plurality of intermittently disposed track sections having one of a rectangular shape and a triangular shape at the edges thereof; and a plurality of automated carriers that move along the track system for carrying a plurality of processing bins between the plurality of processing stations, wherein each processing station comprises a perception unit that perceives identifying indicia representative of an identity of an object among a plurality of objects received from an input conveyance system, wherein each processing station further comprises an articulated arm having an end effector that acquires the object from among the plurality of objects at an input area of the processing station and deposits the object into an identified processing bin moved to the processing station by one of the plurality of automated carriers, said identified processing bin being associated with the identifying indicia and said identified processing bin being provided as one of the plurality of processing bins, and wherein each of the plurality of automated carriers moves along the track system in at least two mutually orthogonal directions.

13. The processing system as claimed in claim 12, wherein the input conveyance system includes a primary conveyor and an input area conveyor onto which the plurality of objects are diverted from the primary conveyor.

14. The processing system as claimed in claim 12, wherein the plurality of objects is provided in an input bin that is one of a plurality of input bins, each including a further plurality of objects.

15. The processing system as claimed in claim 12, wherein an assignment of a manifest for each processing bin is dynamically assigned.

16. The processing system as claimed in claim 12, further comprising an output conveyor onto which a completed processing bin is placed.

17. The processing system as claimed in claim 12, further comprising an empty processing bin supply conveyance system for providing empty processing bins to one or more of the plurality of automated carriers.

18. The processing system as claimed in claim 12, wherein each of the plurality of intermittently disposed track sections has a rectangular shape and wherein one or more of the plurality of automated carriers includes a plurality of wheel assemblies configured to pivot around one or more corners of a respective track section.

19. The processing system as claimed in claim 12, wherein one or more of the plurality of wheel assemblies comprises a guide that urges against at least a portion of a track section to align the carrier with respect to the track section.

20. The processing system as claimed in claim 12, wherein the plurality of intermittently disposed track sections are arranged to form a two-dimensional grid.

21. A method of processing objects, said method comprising:

perceiving identifying indicia representative of an identity of an object among a plurality of objects received from an input conveyance system;

identifying one of a plurality of processing bins associated with the identifying indicia to receive the object;

moving an automated carrier that carries the identified processing bin along a track system to a processing station;

acquiring the object from the plurality of objects at an input area of the processing station using an end effector of an articulated arm;

depositing the object into the identified processing bin using the end effector of the articulated arm; and moving the automated carrier along the track system away from the processing station to carry the identified processing bin to an output conveyor, wherein the track system comprises a plurality of intermittently disposed track sections, each of the plurality of intermittently disposed track sections having one of a rectangular shape and a triangular shape at the edges thereof.

22. The method as claimed in claim 21, wherein the plurality of objects is provided in an input bin that is one of a plurality of input bins, each including a further plurality of objects.

23. The method as claimed in claim 21, wherein the automated carrier is movable in at least two dimensions along the track system.

24. The method as claimed in claim 21, further comprising dynamically assigning a manifest for each processing bin.

25. The method as claimed in claim 21, further comprising providing an empty processing bin through a process bin exchanger to any of the plurality of other automated carriers.

26. The method as claimed in claim 21, wherein the processing station is one of a plurality of processing systems that are each in communication with the input conveyance system.

27. The method as claimed in claim 21, further comprising rotating at least one of a plurality of paddles to a second position to permit unloading of the identified processing bin off the carrier.

28. The method as claimed in claim 23, wherein the plurality of intermittently disposed track sections comprises a plurality of raised track sections spaced apart from one another on a platform.

29. The method as claimed in claim 28, wherein the automated carrier comprises a plurality of wheel assemblies that are pivotally mounted, and wherein each moving the automated carrier involves moving the automated carrier in at least two dimensions along the track system including:

rotating the plurality of wheel assemblies to a first pivot position to move the carrier in a first dimension from any of the plurality of raised track sections to an adjacent track section; and rotating the plurality of wheel assemblies to a second pivot position to move the carrier in a second dimension from any of the plurality of raised track sections to an adjacent track section, wherein the first dimension and the second dimension are mutually orthogonal.

30. A processing system, comprising:

a processing station;

a track system that comprises a plurality of intermittently disposed track sections; and a plurality of automated carriers that move along the track system carrying a plurality of processing bins to and from the processing station, wherein the processing station comprises a perception unit that perceives identifying indicia representative of an identity of an object among a plurality of objects received from an input conveyance system, wherein the processing station further comprises an articulated arm having an end effector that acquires the object from among the plurality of objects at an input area of the processing station and deposits the object into an identified processing bin moved along the track system to the processing station by one of the plurality of automated carriers, said identified processing bin being associated with the identifying indicia and said identified processing bin being provided as one of the plurality of processing bins, and wherein each of the plurality of intermittently disposed track sections has a polygonal shape, and one or more of the plurality of automated carriers includes a plurality of wheel assemblies configured to pivot around one or more corners of a respective track section.

31. The processing system as claimed in claim 30, wherein the input conveyance system includes a primary conveyor and an input area conveyor onto which the plurality of objects are diverted from the primary conveyor.

32. The processing system as claimed in claim 30, wherein the plurality of objects is provided in an input bin that is one of a plurality of input bins, each including a further plurality of objects.

33. The processing system as claimed in claim 30, wherein one or more of the plurality of automated carriers is movable in at least two dimensions along the track system.

34. The processing system as claimed in claim 30, wherein an assignment of a manifest for each processing bin is dynamically assigned.

35. The processing system as claimed in claim 30, further comprising an empty processing bin supply conveyance system for providing empty processing bins to one or more of the plurality of automated carriers.

36. The processing system as claimed in claim 30, wherein the processing station is provided as one of a plurality of processing stations that are each in communication with the input conveyance system.

37. The processing system as claimed in claim 30, wherein the polygonal shape of each of the plurality of intermittently disposed track sections is a rectangular shape.

38. The processing system as claimed in claim 30, further comprising an output conveyor onto which a completed processing bin is placed.

39. The processing system as claimed in claim 38, further comprising a processing bin exchanger for removing the completed processing bin from any of the plurality of automated carriers and for loading an empty processing bin onto any of the plurality of automated carriers.

40. The processing system as claimed in claim 30, wherein the plurality of intermittently disposed track sections comprises a plurality of raised track sections spaced apart from one another on a platform.

41. The processing system as claimed in claim 40, wherein the automated carrier is configured to move in a first direction from any track section to an adjacent track section when the plurality of wheel assemblies are rotated to a first pivot position and move in a second direction from any track section when the wheel assemblies are rotated to a second pivot position, wherein the first direction is orthogonal to the second direction.

42. A processing system comprising:
a plurality of processing stations;
a track system that comprises a plurality of intermittently disposed track sections; and
a plurality of automated carriers that move in at least two mutually orthogonal directions along the track system for carrying a plurality of processing bins between the plurality of processing stations,
wherein each processing station comprises a perception unit that perceives identifying indicia representative of an identity of an object among a plurality of objects received from an input conveyance system,
wherein each processing station further comprises an articulated arm having an end effector that acquires the object from among the plurality of objects at an input area of the processing station and deposits the object into an identified processing bin moved to the processing station by one of the plurality of automated carriers, said identified processing bin being associated with the identifying indicia and said identified processing bin being provided as one of the plurality of processing bins, and
wherein each of the plurality of intermittently disposed track sections has a polygonal shape, and one or more of the plurality of automated carriers includes a plurality of wheel assemblies configured to pivot around one or more corners of a respective track section.

43. The processing system as claimed in claim 42, wherein the input conveyance system includes a primary conveyor and an input area conveyor onto which the plurality of objects are diverted from the primary conveyor.

44. The processing system as claimed in claim 42, wherein the plurality of objects is provided in an input bin that is one of a plurality of input bins, each including a further plurality of objects.

45. The processing system as claimed in claim 42, wherein an assignment of a manifest for each processing bin is dynamically assigned.

46. The processing system as claimed in claim 42, further comprising an output conveyor onto which a completed processing bin is placed.

47. The processing system as claimed in claim 42, further comprising an empty processing bin supply conveyance system for providing empty processing bins to one or more of the plurality of automated carriers.

48. The processing system as claimed in claim 42, wherein one or more of the plurality of wheel assemblies comprises a guide that urges against at least a portion of a track section to align the carrier with respect to the track section.

49. The processing system as claimed in claim 42, wherein the plurality of intermittently disposed track sections are arranged to form a two-dimensional grid.

50. The processing system as claimed in claim 42, wherein the polygonal shape of each of the plurality of intermittently disposed track sections is a rectangular shape.

51. A method of processing objects, said method comprising:
perceiving identifying indicia representative of an identity of an object among a plurality of objects received from an input conveyance system;
identifying one of a plurality of processing bins associated with the identifying indicia to receive the object;
moving an automated carrier that carries the identified processing bin in at least two dimensions along a track system to a processing station;
acquiring the object from the plurality of objects at an input area of the processing station using an end effector of an articulated arm;
depositing the object into the identified processing bin using the end effector of the articulated arm; and
moving the automated carrier along the track system away from the processing station to carry the identified processing bin to an output conveyor,
wherein the track system includes a plurality of intermittently disposed track sections, each of the plurality of intermittently disposed track sections having a polygonal shape, and the automated carrier including a plurality of wheel assemblies configured to pivot around one or more corners of a respective track section.

52. The method as claimed in claim 51, wherein the plurality of objects is provided in an input bin that is one of a plurality of input bins, each including a further plurality of objects.

53. The method as claimed in claim 51, wherein the automated carrier is movable in at least two dimensions along the track system.

54. The method as claimed in claim 51, further comprising dynamically assigning a manifest for each processing bin.

55. The method as claimed in claim 51, further comprising providing an empty processing bin through a process bin exchanger to any of a plurality of other automated carriers.

56. The method as claimed in claim 51, wherein the processing station is one of a plurality of processing systems that are each in communication with the input conveyance system.

57. The method as claimed in claim 51, wherein the polygonal shape of each of the plurality of intermittently disposed track sections is a rectangular shape.

58. The method as claimed in claim 51, wherein the plurality of intermittently disposed track sections comprises a plurality of raised track sections spaced apart from one another on a platform.

59. The method as claimed in claim 58, wherein each moving the automated carrier involves moving the automated carrier in the at least two dimensions along the track system including:
   rotating the plurality of wheel assemblies to a first pivot position to move the carrier in a first dimension from any of the plurality of raised track sections to an adjacent track section; and
   rotating the plurality of wheel assemblies to a second pivot position to move the carrier in a second dimension from any of the plurality of raised track sections to an adjacent track section, wherein the first dimension and the second dimension are mutually orthogonal.

* * * * *